United States Patent
Tanahashi et al.

(10) Patent No.: US 10,048,426 B2
(45) Date of Patent: Aug. 14, 2018

(54) LIGHT GUIDE AND LIGHTING APPARATUS INCLUDING THE SAME

(71) Applicant: PANASONIC INTELLECTUAL PROPERTY MANAGEMENT CO., LTD., Osaka (JP)

(72) Inventors: Osamu Tanahashi, Kyoto (JP); Hiroyuki Sekii, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 89 days.

(21) Appl. No.: 15/412,471

(22) Filed: Jan. 23, 2017

(65) Prior Publication Data
US 2017/0212294 A1    Jul. 27, 2017

(30) Foreign Application Priority Data
Jan. 26, 2016   (JP) .................................. 2016-012877

(51) Int. Cl.
*F21V 8/00* (2006.01)
*G02B 6/00* (2006.01)

(52) U.S. Cl.
CPC ......... *G02B 6/0045* (2013.01); *G02B 6/0078* (2013.01); *G02B 6/0053* (2013.01); *G02B 6/0055* (2013.01)

(58) Field of Classification Search
CPC .. G02B 6/0016; G02B 6/0038; G02B 6/0053; G02B 6/0055; G02B 6/0058; G02B 6/0045
See application file for complete search history.

(56) References Cited

U.S. PATENT DOCUMENTS

| | | | | |
|---|---|---|---|---|
| 5,980,054 A * | 11/1999 | Fukui | ................... | G02B 6/0036 362/19 |
| 8,564,854 B2 | 10/2013 | Kawano et al. | | |
| 8,979,350 B2 * | 3/2015 | Wang He | ............. | G02B 6/0031 362/339 |
| 9,008,480 B2 | 4/2015 | Nakashiba et al. | | |
| 9,703,032 B2 * | 7/2017 | Wu | ....... | G02B 6/0055 |
| 2015/0377456 A1 | 12/2015 | Onishi et al. | | |

(Continued)

FOREIGN PATENT DOCUMENTS

| | | |
|---|---|---|
| JP | 05-107542 | 4/1993 |
| JP | 07-294745 | 11/1995 |
| JP | 2013-097876 | 5/2013 |

*Primary Examiner* — Krabi Guharay
(74) *Attorney, Agent, or Firm* — Greenblum & Bernstein, P.L.C.

(57) ABSTRACT

A light guide includes a front surface. A back surface is opposite the front surface and includes a depression. A light incident surface introduces light. The light reflects off the depression and is emitted through the front surface. The depression includes an inclined side surface that faces the light incident surface. The inclined side surface includes a reflective curved surface that includes at least 50% of a surface area of the inclined side surface. In a cross section view of the depression in a plane substantially orthogonal to the front surface, a first tangent that touches a curved line defining the reflective curved surface of the inclined side surface and a second tangent that touches the curved line in a different location than the first tangent form a first angle that is greater than or equal to 0° and less than or equal to 30°.

20 Claims, 15 Drawing Sheets

(56) References Cited

U.S. PATENT DOCUMENTS

2015/0377459 A1 12/2015 Kotera et al.
2016/0377783 A1 12/2016 Tanahashi et al.
2016/0377793 A1 12/2016 Saimi et al.
2016/0377794 A1 12/2016 Kawachi et al.

* cited by examiner

FIG. 1
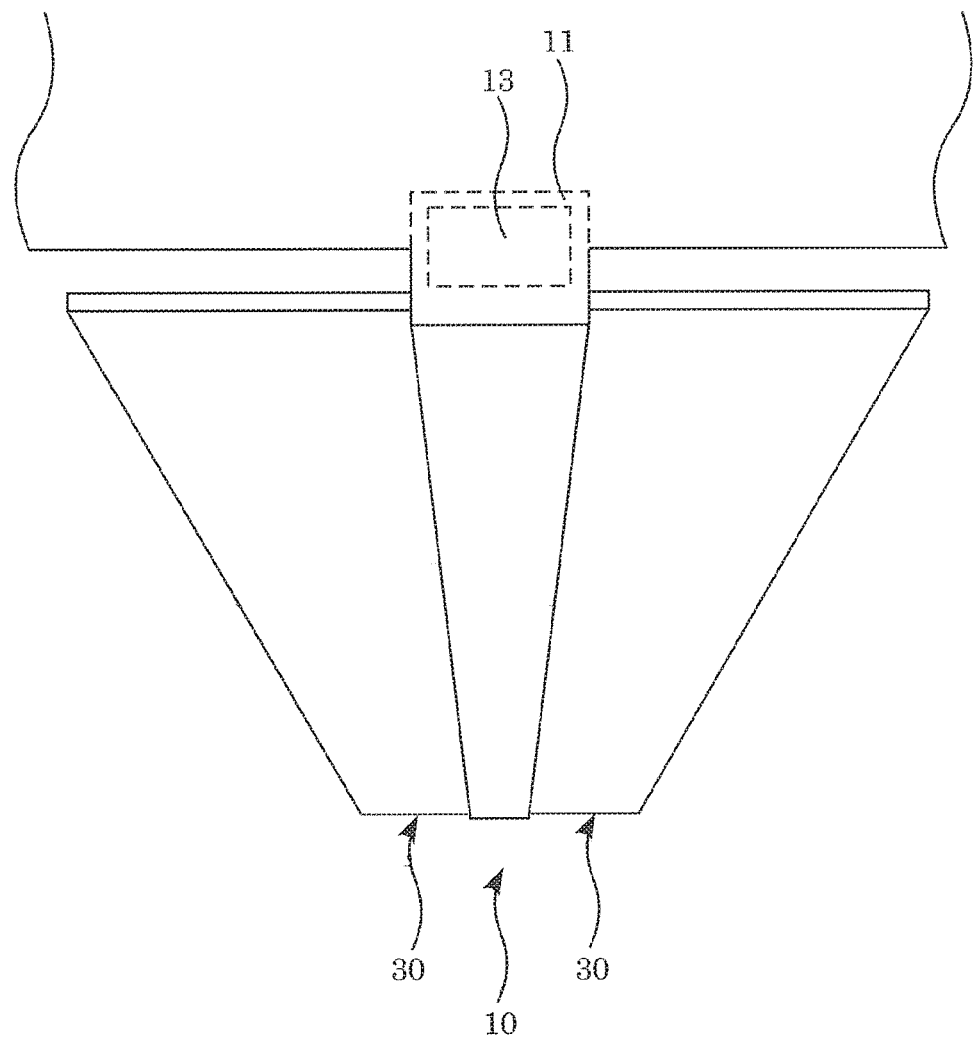
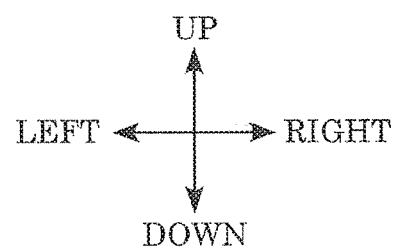

LIGHT GUIDE AND LIGHTING APPARATUS INCLUDING THE SAME

CROSS REFERENCE TO RELATED APPLICATION

This application claims the benefit of priority of Japanese Patent Application Number 2016-012877 filed on Jan. 26, 2016, the entire content of which is hereby incorporated by reference.

BACKGROUND

1. Technical Field

The present disclosure relates to a light guide that guides light that enters through a light incident surface and emits light through a front surface, and a lighting apparatus including such a light guide.

2. Description of the Related Art

A light guide that receives light from a light source through a side surface and emits light through a front surface and a lighting apparatus including such a light guide are conventionally known (for example, see Japanese Unexamined Patent Application Publication No. H5-107542).

SUMMARY

In addition to the distribution of light emitted out through the front surface of the light guide, important quality factors of light guides include how the emitted light appears.

However, with the light guide disclosed in Japanese Unexamined Patent Application Publication No. H5-107542, incident light is emitted from the light guide through the front surface after reflecting off depressions opposite the front surface. With this light guide, there is a concern that the light emitted from the light guide through the front surface will be uneven (in luminance) depending on the viewpoint of the viewer (i.e., will appear unsightly to the viewer). Consequently, there is a desire to reduce glare resulting from the unevenness in the light emitted from the light guide through the front surface.

The present disclosure has been conceived in view of the above problem, and has an object to provide a light guide capable of inhibiting unevenness in light emitted from light guide through the front surface, and a lighting apparatus including such a light guide.

In order to achieve the above object, in one aspect, the light guide according to the present disclosure includes a front surface, a back surface opposite the front surface and including a depression, and a light incident surface that introduces light. The light reflects off the depression and is emitted through the front surface. The depression includes an inclined side surface that faces the light incident surface. The inclined side surface includes a reflective curved surface that includes at least 50% of a surface area of the inclined side surface. In a cross section view of the depression in a plane substantially orthogonal to the front surface of the light guide, a first tangent that touches a curved line defining the reflective curved surface of the inclined side surface and a second tangent that touches the curved line in a different location than the first tangent form a first angle that is greater than or equal to 0° and less than or equal to 30°.

Moreover, in one aspect, the lighting apparatus according to the present disclosure includes the above light guide and a light source that introduces the light onto the light incident surface of the light guide.

Accordingly, unevenness in light emitted from the light guide through the front surface can be inhibited.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 1 is a perspective view of the lighting apparatus according to Embodiment 1;

DETAILED DESCRIPTION OF THE EMBODIMENTS

Hereinafter, embodiments according to the present disclosure will be described with reference to the drawings. Note that the embodiment described below shows a specific example of the present disclosure. The numerical values, shapes, materials, elements, the arrangement and connection of the elements, etc., indicated in the following embodiment are mere examples, and therefore are not intended to limit the inventive concept. Therefore, among the elements in the following embodiment, those not recited in any of the independent claims defining the most generic part of the inventive concept are described as optional elements.

Moreover, "substantially" and "approximate" mean, for example in the case of "substantially the same", not only exactly the same, but what would be recognized as essentially the same as well.

Note that the respective figures are schematic diagrams and are not necessarily precise illustrations. Additionally, like reference signs indicate like elements. As such, overlapping explanations of like elements are omitted or simplified.

Embodiment 1

Hereinafter, a light guide and a lighting apparatus including the light guide according to Embodiment 1 of the present disclosure will be described.

(Configuration)

Figure 2:
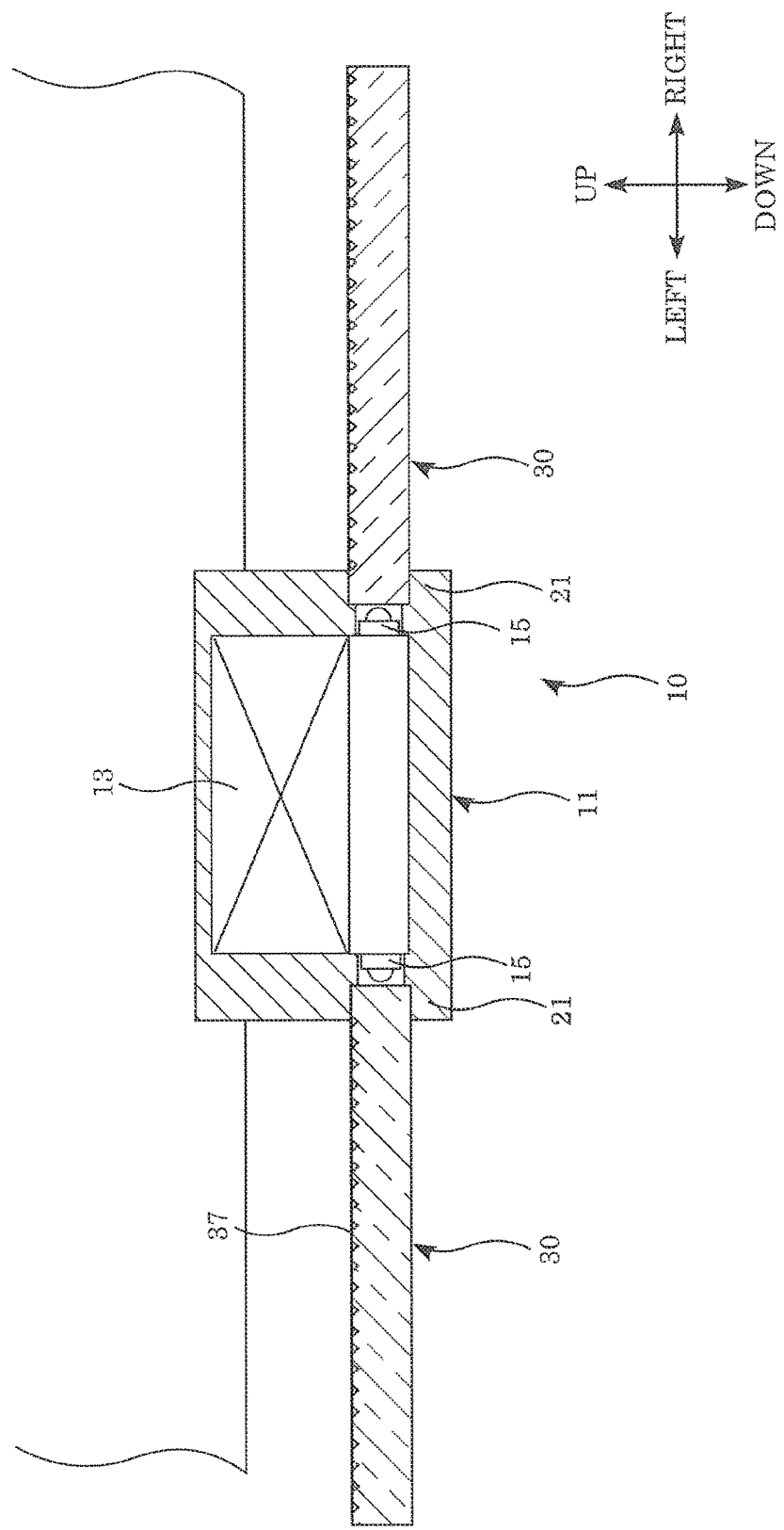
FIG. 2 is a cross section view of the lighting apparatus according to Embodiment 1.

First, the lighting apparatus according to Embodiment 1 of the present disclosure will be described with reference to FIG. 1 and FIG. 2. FIG. 1 is a perspective view of the lighting apparatus according to Embodiment 1. FIG. 2 is a cross section view of the lighting apparatus according to Embodiment 1.

In FIG. 1, the directions of forward, backward, left, right, up, and down are shown, where, in a state in which the lighting apparatus is attached to a ceiling, the direction from the lighting apparatus toward the ceiling is defined as up, and the opposite direction from the lighting apparatus away from the ceiling is defined as down. Note that the directions illustrated in FIG. 2 and subsequent figures correspond to those illustrated in FIG. 1. Also note that the up and down directions, left and right directions, and forward and backward directions illustrated in FIG. 1 may change depending on how the lighting apparatus is used, and as such, are non-limiting examples. The same applies to all subsequent figures.

As illustrated in FIG. 1, lighting apparatus 10 is an edge-lit lighting apparatus, and is fixed in place by being connected to an external power supply fixed to the ceiling (not illustrated in the drawings).

Lighting apparatus 10 includes main body 11, power supply 13, light source 15, and two light guides 30.

Main body 11 is a box-shaped component that is elongated in the forward and backward directions, and houses power supply 13 which is driven by external power. Power supply 13 is capable of being coupled to the external power supply fixed to the ceiling. Power supply 13 electrically connects to the external power supply routed behind (on top) of the ceiling. Light guide supports 21 are provided on both the right and left sides of main body 11.

The left light guide support 21 is a rectangular groove that recedes from the left surface of main body 11 toward the right side. Likewise, the right light guide support 21 is a rectangular groove that recedes from the right surface of main body 11 toward the left side. Both light guide supports 21 are formed so as to sandwich light guides 30 from the top and bottom so as to support light guides 30. Light guide supports 21 fix light guides 30 in place in such a manner that light guides 30 are parallel with the ceiling surface when lighting apparatus 10 is installed on the ceiling. Note that light guide supports 21 may support light guides 30 in a variety of ways. Also note that three or more light guides 30 may be attached to main body 11.

As illustrated in FIG. 2, light sources 15 emit light in a direction parallel to the ceiling surface, away from light source 15, and are electrically connected to a substrate not illustrated in the drawings. The substrate is also housed in main body 11.

Light source 15 is a surface mount device (SMD) type LED device. More specifically, SMD type LED devices are packaged LED devices in which an LED chip (light emitter) is disposed in a cavity formed in a resin container, and the cavity is filled with a phosphor-containing resin. Light sources 15 turn on and off under control by a controller (not illustrated in the drawings) included in power supply 13. Light sources 15 also change in brightness and color under control by the controller included in power supply 13.

Note that light sources 15 are not limited to this configuration; light sources 15 may adopt a chip on board (COB) type light emitting module in which LED chips are directly mounted on a substrate not illustrated in the drawings. Moreover, the light emitter included in light source 15 is not limited to an LED; the light emitter may be a semiconductor light emitter such as a semiconductor laser, or some other solid-state light emitter such as an organic electroluminescent (EL) element or an inorganic EL element.

Light source 15 is disposed between a side surface of light guide 30 (light incident surface 31 of light guides 30; to be described later) and main body 11. Light source 15 is mounted to a substrate so as to face a side surface of light guide 30, and emits light toward light incident surface 31 of light guide 30. In other words, the light emission direction of light source 15 is substantially perpendicular to light incident surface 31 of light guide 30 and substantially parallel to the ceiling surface.

Light source 15 is spaced from light guide 30 so as not to contact light guide 30. Note that when a plurality of light guides 30 are vertically layered so as to be parallel to the ceiling surface, light sources 15 may be provided so as to emit light onto each light incident surface 31 of light guides 30.

Light guide 30 is a flat, plate-like guide with a rectangular plan view shape. Moreover, light guides 30 are supported by light guide supports 21 so as to be held substantially parallel to the ceiling surface. In a plan view of emission surface 33, the up and down directions of light guide 30 correspond to the thickness of light guide 30, the right and left directions of light guide 30 correspond to the longitudinal direction, and the forward and backward directions of light guide 30 correspond to the transverse direction of light guide 30. Note that light guide 30 is not limited to a rectangular shape; light guide 30 may have a disc-like, triangular, or other shape. Light guide 30 is an optical component that guides light from light source 15 toward emission surface 33 (to be described later). Light guide 30 is made of a light-transmissive resin such as polycarbonate or acrylic, but may be made of a different material.

Next, the configuration of light guide 30 according to Embodiment 1 of the present disclosure will be described with reference to FIG. 3 and FIG. 4.

Figure 3:
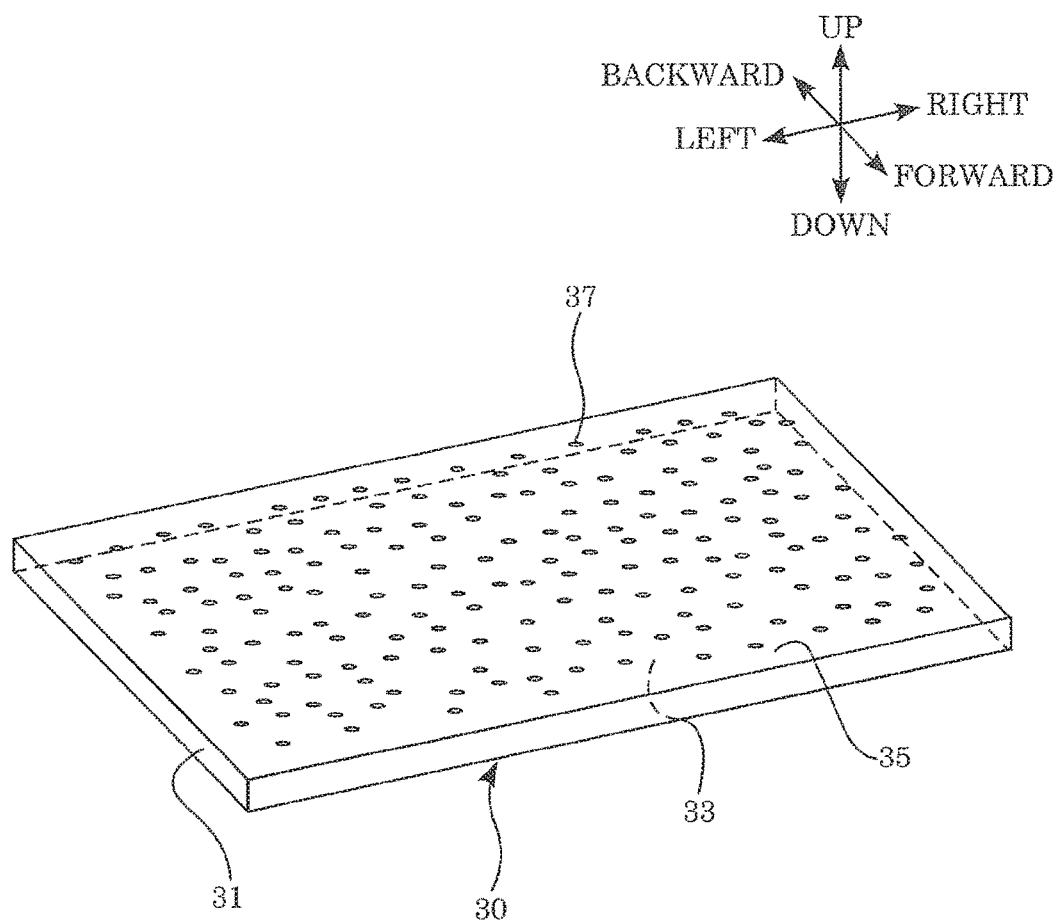
FIG. 3 is a perspective view of the light guide according to Embodiment 1.

FIG. 3 is a perspective view of the light guide according to Embodiment 1. FIG. 4 is an enlarged cross section view of part of the lighting apparatus according to Embodiment 1.

As illustrated in FIG. 3, light guide 30 includes light incident surface 31 that introduces light from light sources 15, emission surface 33 (one example of the front surface) that emits light guided inside light guide 30, and reflective surface 35 (one example of the back surface) that reflects light.

Light incident surface 31 and emission surface 33 of light guide 30 each define a substantially uniform plane. Reflective surface 35 of light guide 30 is disposed opposite emission surface 33 of light guide 30. A plurality of micro prisms 37 are formed on reflective surface 35. Micro prisms 37 are depressions that recede from reflective surface 35 toward emission surface 33. Micro prisms 37 are randomly formed in reflective surface 35.

Figure 4:
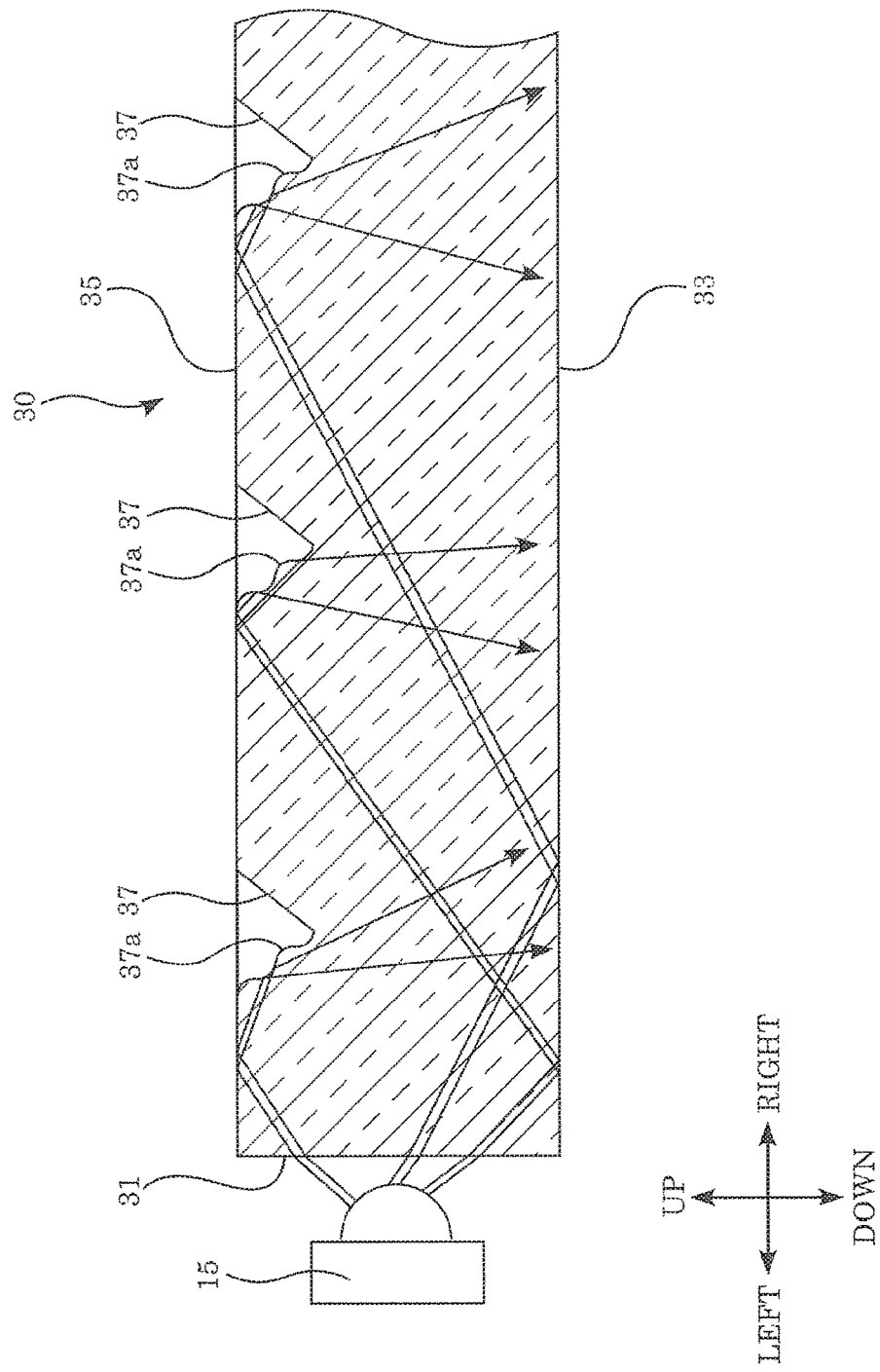
FIG. 4 is an enlarged cross section view of part of the lighting apparatus according to Embodiment 1.

As illustrated in FIG. 4, micro prisms 37 (one example of the depressions) are conical grooves. Effective inclined side surface 37a (one example of the inclined side surface) is formed on an inner circumferential surface (side surface) of micro prism 37, and faces the light incident surface 31 side of light guide 30. The side on which light is incident refers to the side on which light incident surface 31 of light guide 30 is located (i.e., the light source 15 side), as well as the side on which the surface on which light from light source 15 guided in light guide 30 is directly incident is located. Effective inclined side surface 37a is the surface on the light source 15 side of micro prism 37 when light from the light source 15 side is incident on micro prisms 37. In other words, effective inclined side surface 37a occupies about half of the surface area of the inner circumferential surface—more specifically, the half on the light source 15 side of micro prism 37. Effective inclined side surface 37a is a part of curved surface (tapered surface) of a triangular cone when micro prism 37 is viewed from the light source 15 side.

Next, the configuration of micro prism 37 in light guide 30 according to Embodiment 1 of the present disclosure will be described with reference to FIG. 5 and FIG. 6.

Figure 5:
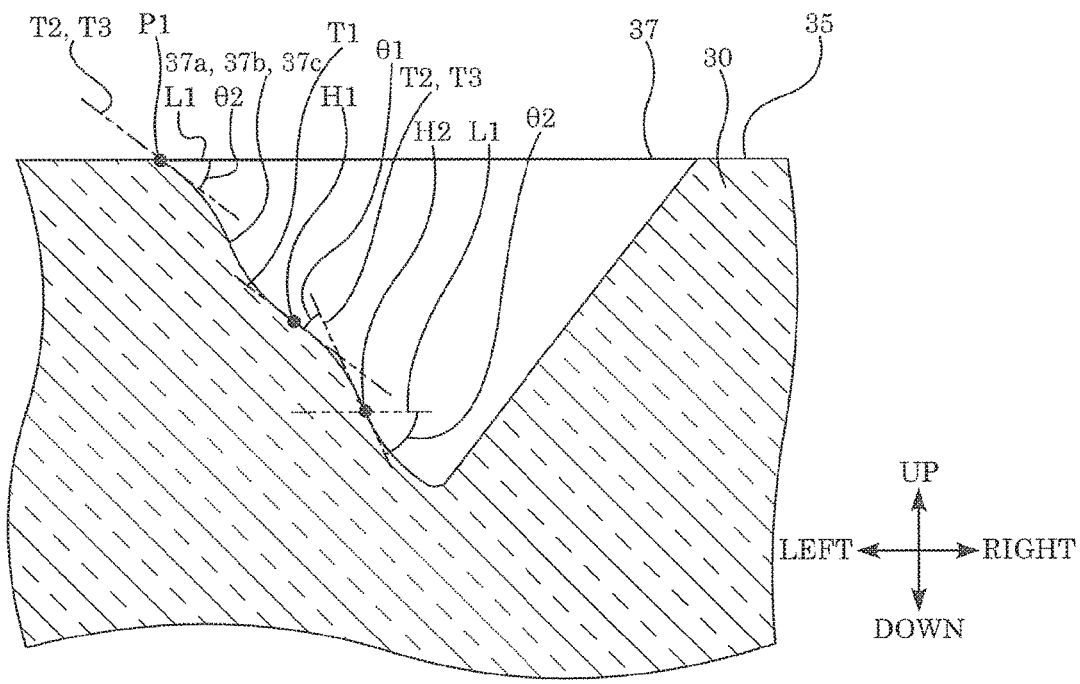
FIG. 5 is an enlarged cross section view of a micro prism in the light guide according to Embodiment 1.

FIG. 5 is an enlarged cross section view of a micro prism in the light guide according to Embodiment 1. FIG. 6 is an enlarged cross section view of a micro prism in the light guide according to Embodiment 1.

As illustrated in FIG. 5, reflective curved surface 37b is formed on effective inclined side surface 37a. In a cross section view of micro prism 37 in a plane substantially orthogonal to emission surface 33 (one example of the front surface) of light guide 30, reflective curved surface 37b is a curved surface formed on effective inclined side surface 37a.

Reflective curved surface 37b preferably covers at least 50% of the surface area of effective inclined side surface 37a. In other words, a plurality of reflective curved surfaces 37b may be formed scattered about on effective inclined side surface 37a, and in this case, the total combined surface area of the plurality of reflective curved surfaces 37b may be at least 50% of the surface area of effective inclined side surface 37a. This embodiment presents a cross section view of micro prism 37 in a plane substantially orthogonal to emission surface 33 of light guide 30. In this case, reflective curved surface 37b begins at the point of connection of reflective surface 35 and effective inclined side surface 37a (hereinafter referred to as first connection point P1), and continues to the vicinity of the deepest part (i.e., the bottom) of micro prism 37.

In a cross section view of micro prism 37 in a plane substantially orthogonal to emission surface 33 of light guide 30, reflective curved surface 37b is defined by curved line 37c.

Curved line 37c is a wave-like line configured of a plurality of consecutive (linked) arcs. Each arc in curved line 37c has substantially the same shape. More specifically, a first end of one arc is connected with a second end of an adjacent arc so as to have point symmetry about the first end, and the arcs are substantially evenly connected in succession so as to form a wave-like curved line 37c. The connection point of one arc and an adjacent arc is an inflection point. The inflection point is a point at which the curvature of a tangent touching curved line 37c changes sign. In other words, the inflection point is the point at 0 when curved line 37c is a twice differentiable function. A tangent touching a first end of an arc in curved line 37c and a tangent touching a second end of an adjacent arc preferably align at an inflection point of curved line 37c. In other words, one arc smoothly connects with an adjacent arc at an inflection point of curved line 37c. Further, "each arc has substantially the same shape" means the arcs have substantially equal radii and substantially equal lengths.

Figure 6:
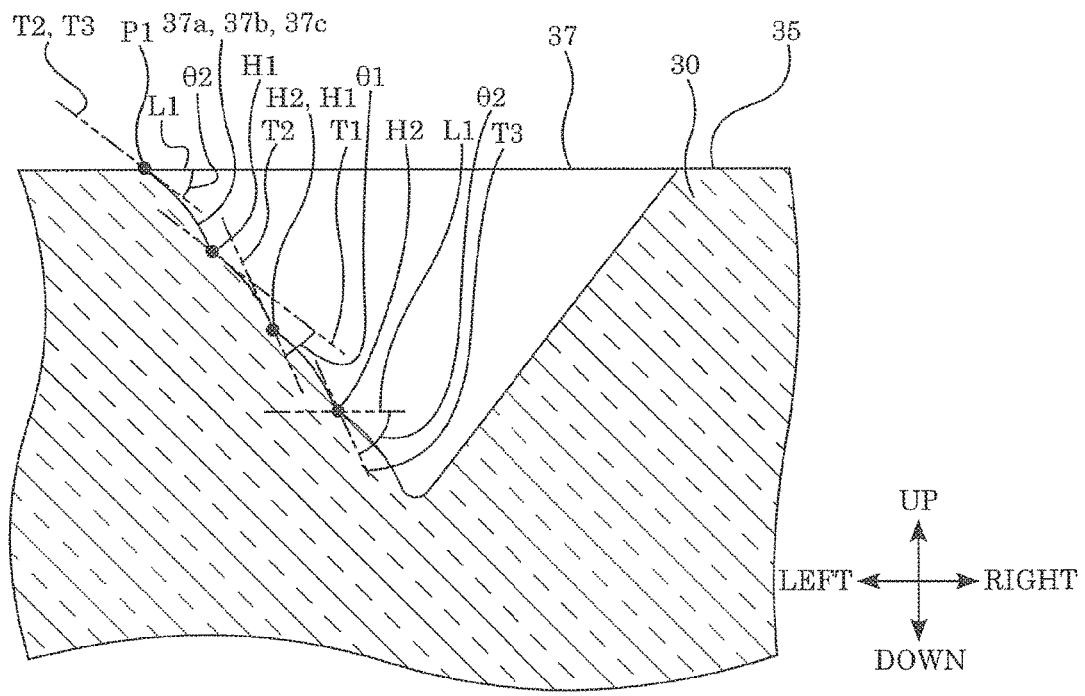
FIG. 6 is an enlarged cross section view of a micro prism in the light guide according to Embodiment 1.

Note that curved line 37c may be configured of a plurality of arcs having substantially the same shape and aligned so as to bow in the same direction to form peaks and valleys between two arcs, as illustrated in FIG. 6.

Moreover, as illustrated in FIG. 5, curved line 37c preferably has a cycle that repeats a natural number of times. More specifically, one cycle of curved line 37c is configured of one arc forming a peak and one arc forming a valley. The arcs in curved line 37c are aligned so as to form a wave-like line configured of peaks and valleys, and curved line 37c has at least one cycle that repeats a natural number of times. In other words, in reflective curved surface 37b, among a plurality of arcs having substantially the same shape, an arc forming a peak and an arc forming a valley are alternately aligned in succession, and the total number of valley arcs is equal to the total number of peak arcs.

Further, in curved line 37c, a line that touches curved line 37c at a given point is defined as first tangent T1 and a line that touches curved line 37c at a different given point is defined as second tangent T2, and first tangent T1 and second tangent T2 form first angle θ1. In FIG. 5, first tangent T1 and second tangent T2 touch curved line 37c at inflection points of curved line 37c. Curved line 37c is formed so as to satisfy a condition that first angle θ1 formed by first tangent T1 and second tangent T2 is greater than or equal to 0° and less than or equal to 30°. Note that the positions at which first tangent T1 and second tangent T2 touch curved line 37c are set freely.

Here, an inflection point on curved line 37c defining reflective curved surface 37b of effective inclined side surface 37a is defined as first inflection point H1, and an inflection point adjacent first inflection point H1 and on a curved line defining a curved surface of effective inclined side surface 37a is defined as second inflection point H2. In this case, curved line 37c is formed so as to satisfy a condition that, when first tangent T1 touches first inflection point H1 and second tangent T2 touches second inflection point H2, first angle θ1 is an acute angle formed by first tangent T1 intersecting second tangent T2, and is greater than or equal to 5° and less than or equal to 30°. Under the supposition that first inflection point H1 is present at a first end of one arc, second inflection point H2 adjacent first inflection point H1 refers to an inflection point that is present at a second end of the same arc. Note that first inflection point H1 and second inflection point H2 may be positioned at inflection points other than those illustrated in FIG. 6, which are arbitrarily set to provide an example. This also applies to other figures as well.

Further, with respect to curved line 37c, a line that passes through curved line 37c and is either coplanar with or parallel to reflective surface 35 of light guide 30 is defined as first straight line L1, and a line that touches an intersecting point of first straight line L1 and curved line 37c of effective inclined side surface 37a is defined as third tangent T3. In this case, curved line 37c is formed so as to satisfy a condition that second angle θ2, which is an acute angle formed by first straight line L1 intersecting third tangent T3, is greater than 0° and less than or equal to 870. Note that in FIG. 5, second tangent T2 and third tangent T3 are the same tangent, but they may be different tangents touching different inflection points.

Note that the radius defining the arc and the length of the arc may be set such that curved line 37c has a cycle that repeats a natural number of times, first angle θ1 is greater than or equal to 5° and less than or equal to 30°, and second angle θ2 is greater than 0° and less than or equal to 87°.

As illustrated in FIG. 4, light emitted by light source 15 is incident on light incident surface 31 of light guide 30, and light guided in light guide 30 is, for example, reflected by reflective surface 35 or reflected by effective inclined side surface 37a of micro prism 37 in reflective surface 35, and then exits light guide 30 through emission surface 33, for example. Here, light that strikes effective inclined side surface 37a is reflected by effective inclined side surface 37a mainly defined by curved line 37c, and then exits light guide 30 through emission surface 33. In other words, light emitted by light source 15 is emitted downward through light guide 30.

Note that light incident surface 31 of light guide 30 is substantially orthogonal to the direction in which light is emitted by light source 15, but effective inclined side surface 37a of micro prism 37 is preferably not orthogonal to a line parallel to the direction in which light is emitted by light source 15. In other words, light incident surface 31 of light guide 30 and effective inclined side surface 37a of micro prism 37 are not parallel.

Simulated light distribution profiles and radiances of light guide 30 are illustrated in FIG. 7A through FIG. 11C.

The model light guide 30 used in lighting apparatus 10 and on which the simulations were performed has a front-to-back length of 30 mm, a left-to-right length of 60 mm, and a thickness H of 4 mm. Further, the diameter of micro prism 37 (the length from first connection point P1 to second connection point P2, to be described later) is 0.25 mm. Moreover, regarding micro prism 37 of this light guide 30, in a cross section view of micro prism 37 in a plane substantially orthogonal to emission surface 33 of light guide 30, a line aligned with reflective surface 35 intersects with effective inclined side surface 37a to form an acute second angle θ2 of 50°. Note that light sources 15 emit light of equal strength.

FIG. 7A, FIG. 8A, FIG. 9A, FIG. 10A, and FIG. 11A are graphs illustrating the relationship between radiance in the left and right directions of the light guide according to Embodiment 1 and length in the left and right directions and forward and backward directions of the light guide.

In FIG. 7A, FIG. 8A, FIG. 9A, FIG. 10A, and FIG. 11A, the solid line represents light emitted from emission surface 33 of light guide 30 on a straight line extending in the left and right directions and orthogonal to the forward and backward directions in the central region of light guide 30 in a plan view of emission surface 33 of light guide 30. The center in the left and right direction is 0, the right direction is represented by positive numbers, and the left direction is represented by negative numbers. Further, in FIG. 7A, FIG. 8A, FIG. 9A, FIG. 10A, and FIG. 11A, the dashed line represents light emitted from emission surface 33 of light guide 30 on a straight line extending in the forward and backward directions and orthogonal to the left and right direction in the central region of light guide 30 in a plan view of emission surface 33 of light guide 30. The center in the forward and backward directions is 0, the back direction is represented by positive numbers, and the front direction is represented by negative numbers.

Figure 7A:
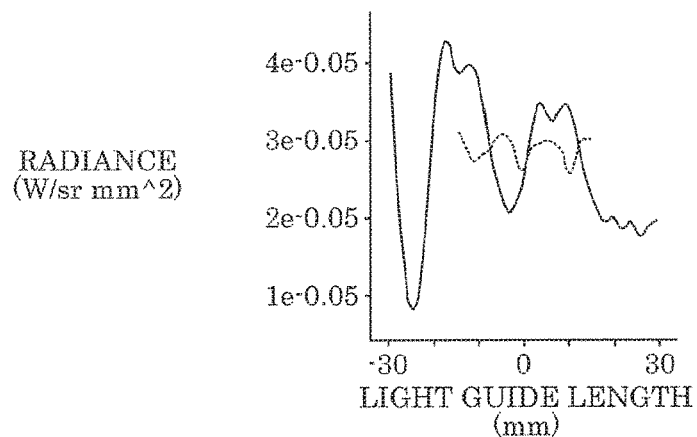
FIG. 7A illustrates a graph indicating the relationship between radiance in the left and right directions of the light guide according to Embodiment 1 and length in the left and right directions and forward and backward directions of the light guide.
Figure 8A:
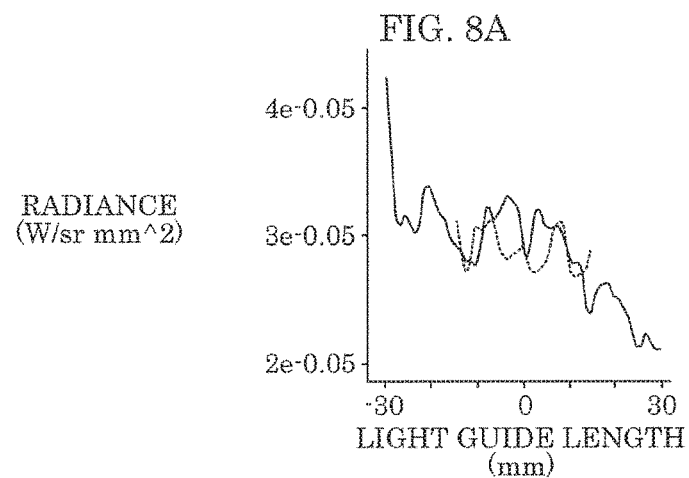
FIG. 8A illustrates a graph indicating the relationship between radiance in the left and right directions of the light guide according to Embodiment 1 and length in the left and right directions and forward and backward directions of the light guide.
Figure 8B:
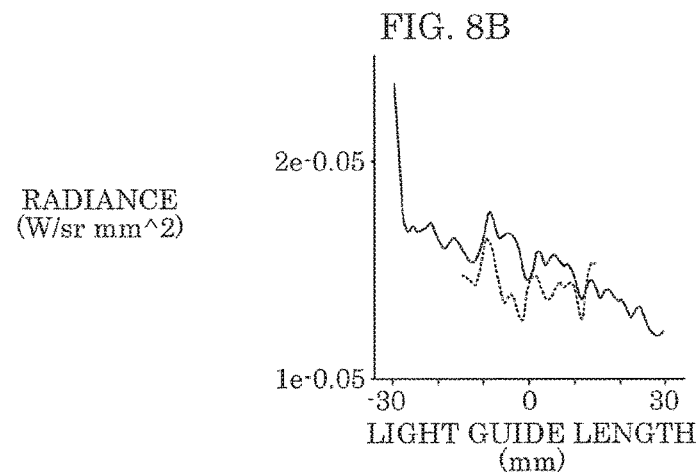
FIG. 8B illustrates a graph indicating the relationship between radiance in the left and right directions of the light guide according to Embodiment 1 and length in the left and right directions and forward and backward directions of the light guide.
Figure 9A:
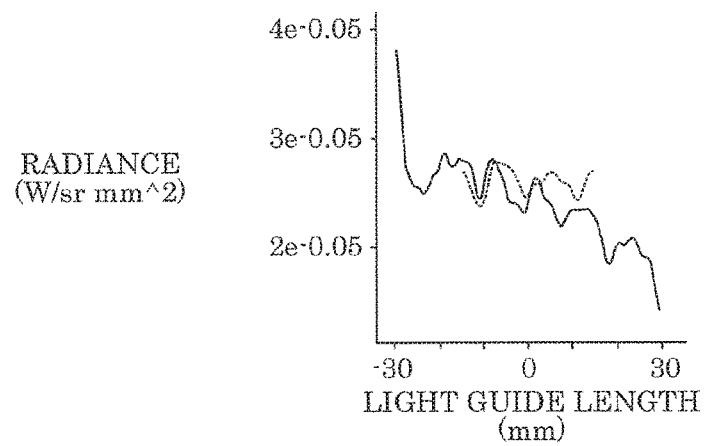
FIG. 9A illustrates a graph indicating the relationship between radiance in the left and right directions of the light guide according to Embodiment 1 and length in the left and right directions and forward and backward directions of the light guide.
Figure 9B:
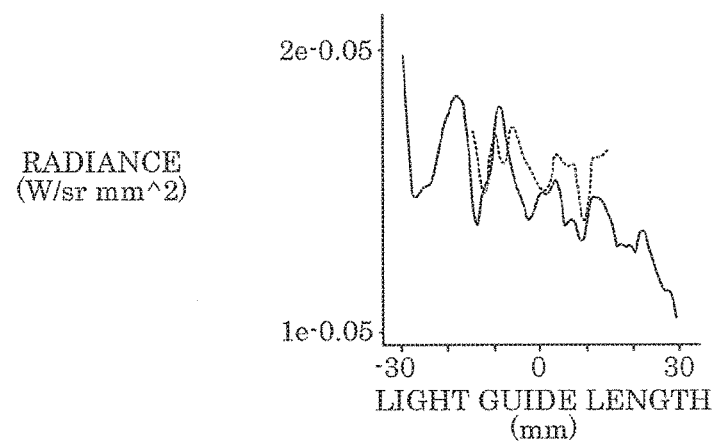
FIG. 9B illustrates a graph indicating the relationship between radiance in the left and right directions of the light guide according to Embodiment 1 and length in the left and right directions and forward and backward directions of the light guide.
Figure 10A:
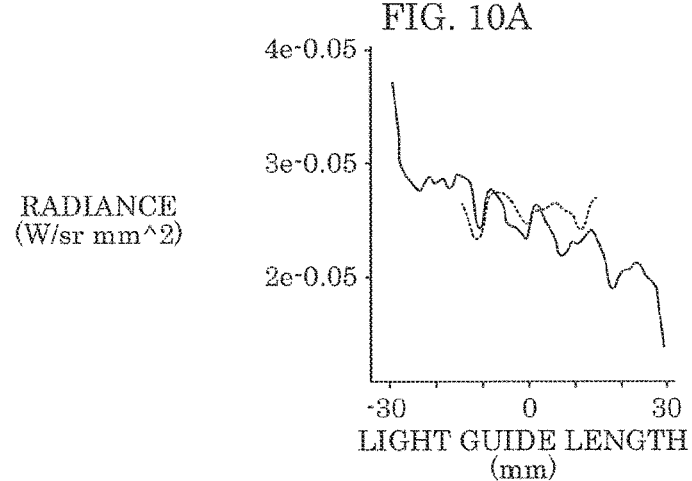
FIG. 10A illustrates a graph indicating the relationship between radiance in the left and right directions of the light guide according to Embodiment 1 and length in the left and right directions and forward and backward directions of the light guide.
Figure 10B:
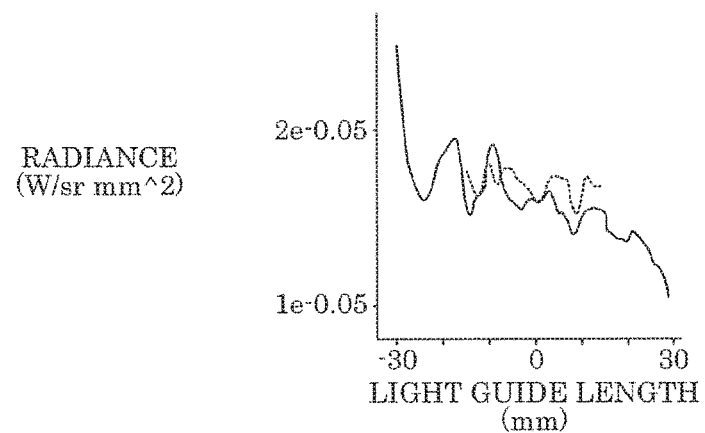
FIG. 10B illustrates a graph indicating the relationship between radiance in the left and right directions of the light guide according to Embodiment 1 and length in the left and right directions and forward and backward directions of the light guide.
Figure 11A:
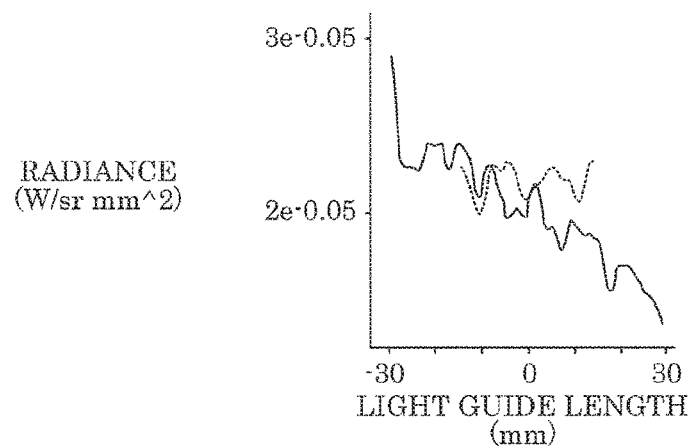
FIG. 11A illustrates a graph indicating the relationship between radiance in the left and right directions of the light guide according to Embodiment 1 and length in the left and right directions and forward and backward directions of the light guide.
Figure 11B:
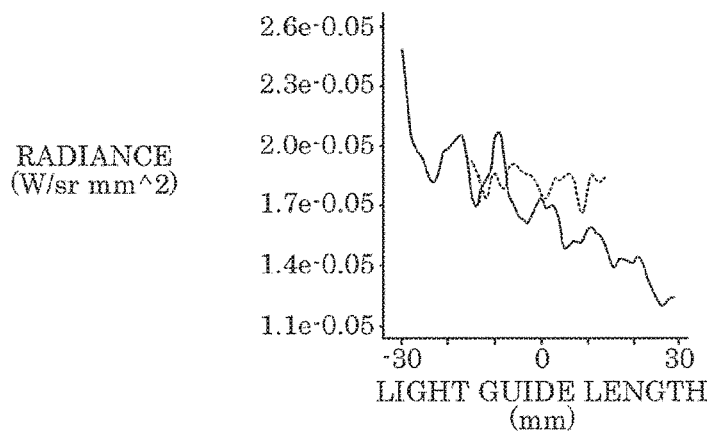
FIG. 11B illustrates a graph indicating the relationship between radiance in the left and right directions of the light guide according to Embodiment 1 and length in the left and right directions and forward and backward directions of the light guide.

As illustrated in FIG. 7A, reflective curved surface 37b is not formed on effective inclined side surface 37a in micro prism 37 of this light guide 30 (in this case, first angle θ1=0° and effective inclined side surface 37a is defined by a straight line in a cross section view). As illustrated in FIG. 8A, reflective curved surface 37b is formed in micro prism 37 of this light guide 30 such that first angle θ1=5°. As illustrated in FIG. 9A, reflective curved surface 37b is formed in micro prism 37 of this light guide 30 such that first angle θ1=10°. As illustrated in FIG. 10A, reflective curved surface 37b is formed in micro prism 37 of this light guide 30 such that first angle θ1=20°. As illustrated in FIG. 11A, reflective curved surface 37b is formed in micro prism 37 of this light guide 30 such that first angle θ1=30°.

As illustrated in FIG. 7A, FIG. 8A, FIG. 9A, FIG. 10A, and FIG. 11A, in the solid and dashed line graphs, radiance incrementally decreases with an increase in first angle θ1. In other words, in accordance with an increase in first angle θ1, the strength of light emitted in a predetermined direction from emission surface 33 decreases. Further, the amplitude of the graphs of radiances illustrated by the solid and dashed lines also decreases with an increase in first angle θ1.

As illustrated in FIG. 7A, in the solid line graph, when reflective curved surface 37b is not formed on effective inclined side surface 37a (i.e., when first angle θ1=0°) the amplitude of the graph illustrating radiance is large. As illustrated in FIG. 8A, FIG. 9A, FIG. 10A, and FIG. 11A, in the solid line graph, when reflective curved surface 37b is formed on effective inclined side surface 37a (i.e., when first angle θ1=5°, 10°, 20°, and 30°), the amplitude of the graph illustrating radiance is smaller than the solid line graph illustrated in FIG. 7A.

FIG. 7B, FIG. 8B, FIG. 9B, FIG. 10B, and FIG. 11B are graphs illustrating the relationship between radiance in the left and right directions of the light guide according to Embodiment 1 and length in the left and right directions and forward and backward directions of the light guide.

In FIG. 7B, FIG. 8B, FIG. 9B, FIG. 10B, and FIG. 11B, the solid line represents light emitted from emission surface 33 of light guide 30 on a straight line extending in the left and right directions and orthogonal to the forward and backward directions in the central region of light guide 30 in a view tilted 45° relative to a plan view of emission surface 33 of light guide 30. Further, in FIG. 7B, FIG. 8B, FIG. 9B, FIG. 10B, and FIG. 11B, the dashed line represents light emitted from emission surface 33 of light guide 30 on a straight line extending in the forward and backward directions and orthogonal to the left and right direction in the central region of light guide 30 in a plan view of emission surface 33 of light guide 30.

As illustrated in FIG. 7B, FIG. 8B, FIG. 9B, FIG. 10B, and FIG. 11B, in the solid and dashed line graphs, radiance incrementally decreases with an increase in first angle θ1. In other words, in accordance with an increase in first angle θ1, the strength of light emitted in a predetermined direction from emission surface 33 decreases. Further, the amplitude of the graphs of radiances illustrated by the solid and dashed lines also decreases with an increase in first angle θ1.

Figure 7B:
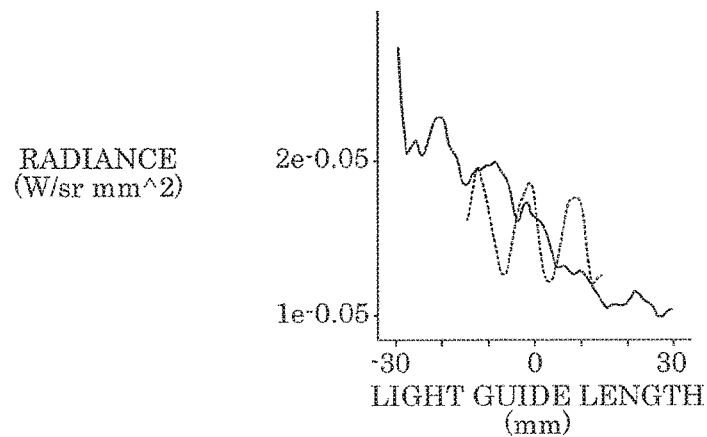
FIG. 7B illustrates a graph indicating the relationship between radiance in the left and right directions of the light guide according to Embodiment 1 and length in the left and right directions and forward and backward directions of the light guide.

As illustrated in FIG. 7B, in the solid line graph, when reflective curved surface 37b is not formed on effective inclined side surface 37a (i.e., when first angle θ1=0°) the fluctuation representing radiance is large. As illustrated in FIG. 8B, FIG. 9B, FIG. 10B, and FIG. 11B, in the solid line graph, when reflective curved surface 37b is formed on effective inclined side surface 37a (i.e., when first angle θ1=5°, 10°, 20°, and 30°), the fluctuation representing radiance is smaller than the solid line graph illustrated in FIG. 7B.

FIG. 7C, FIG. 8C, FIG. 9C, FIG. 10C, FIG. 11C illustrate light distribution profiles of the light guide according to Embodiment 1.

As illustrated in FIG. 7C, FIG. 8C, FIG. 9C, FIG. 10C, and FIG. 11C, the vicinity around the −90° mark illustrates the emission strength of light reflected by micro prisms 37. Further, the vicinity around the 30° mark in the light distribution profile illustrates the emission strength of light emitted out without being reflected by micro prisms 37.

Figure 7C:
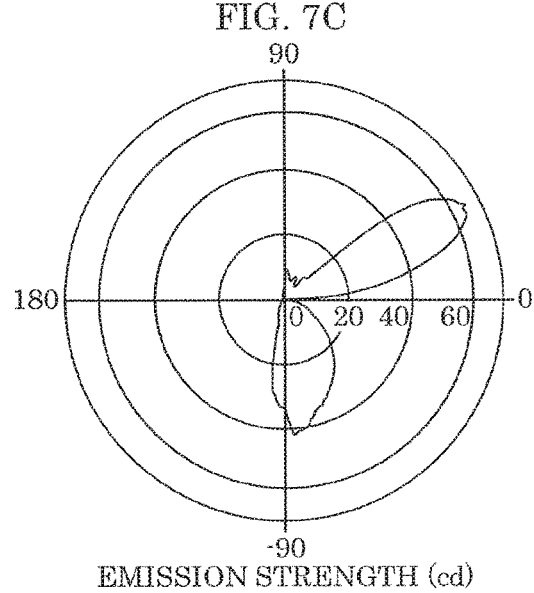
FIG. 7C illustrates a light distribution profile of the light guide according to Embodiment 1.
Figure 8C:
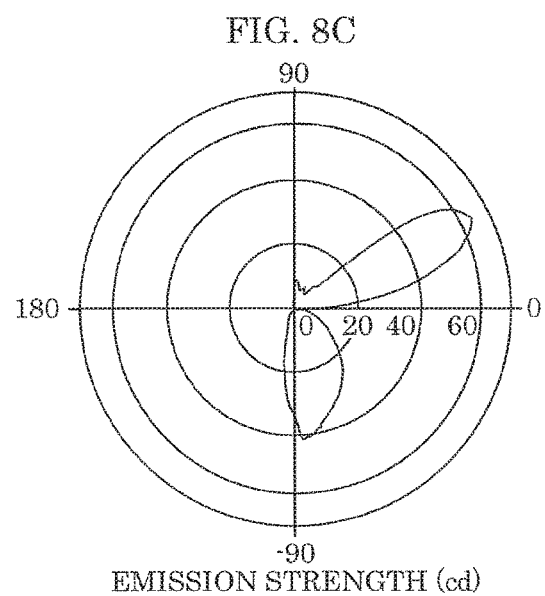
FIG. 8C illustrates a light distribution profile of the light guide according to Embodiment 1.
Figure 9C:
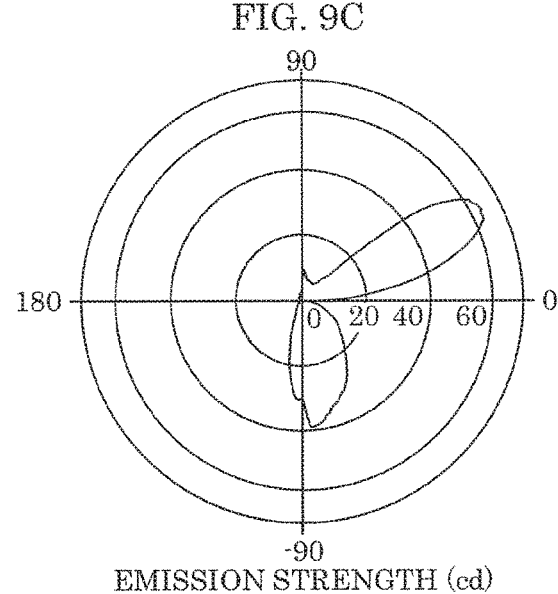
FIG. 9C illustrates a light distribution profile of the light guide according to Embodiment 1.
Figure 10C:
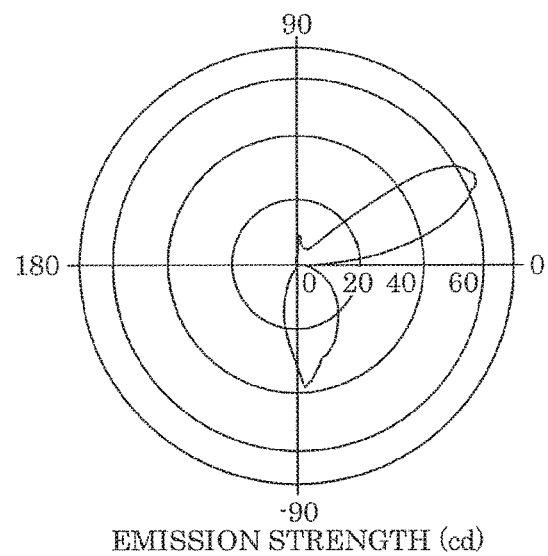
FIG. 10C illustrates a light distribution profile of the light guide according to Embodiment 1.
Figure 11C:
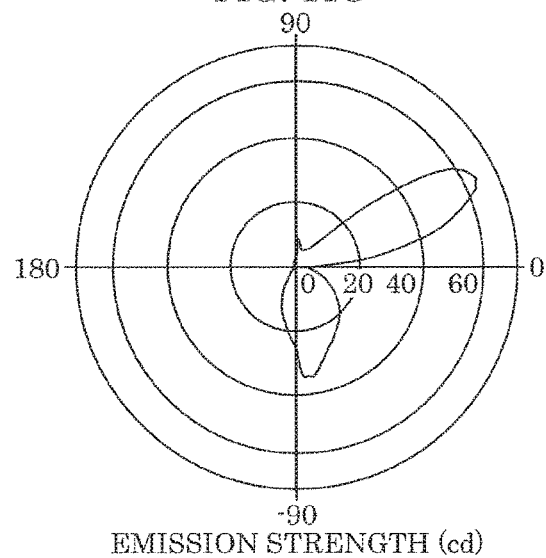
FIG. 11C illustrates a light distribution profile of the light guide according to Embodiment 1.

As illustrated in FIG. 7C, the maximum luminous intensity of this light guide 30 is 42.9 cd. As illustrated in FIG. 8C, the maximum luminous intensity of this light guide 30 is 41.4 cd. As illustrated in FIG. 9C, the maximum luminous intensity of this light guide 30 is 39.8 cd. As illustrated in FIG. 10C, the maximum luminous intensity of this light guide 30 is 39.0 cd. As illustrated in FIG. 11C, the maximum luminous intensity of this light guide 30 is 35.2 cd.

As illustrated in FIG. 7C, FIG. 8C, FIG. 9C, FIG. 10C, and FIG. 11C, the maximum luminous intensity of light reflected by micro prisms 37 in light guides 30 incrementally decreases with an increase in first angle θ1. In other words, in these light guides 30, the strength of light emitted in a predetermined direction from emission surface 33 decreases in accordance with an increase in first angle θ1, that is to say, the strength of the light traveling in the predetermined direction softens. As such, in these light guides 30, light is emitted from emission surface 33 more broadly than when reflective curved surface 37b is not formed on effective inclined side surface 37a (i.e., when first angle θ1=0°).

Advantageous Effects

Next, advantageous effects of light guide 30 and lighting apparatus 10 including light guide 30 according to Embodiment 1 will be described.

As described above, light guide 30 according to Embodiment 1 includes emission surface 33, reflective surface 35 opposite emission surface 33 and including micro prism 37, and light incident surface 31 that introduces light. The light reflects off micro prism 37 and is emitted through emission surface 33. Micro prism 37 includes effective inclined side surface 37a that faces light incident surface 31. Effective inclined side surface 37a includes reflective curved surface 37b that includes at least 50% of the surface area of effective inclined side surface 37a. in a cross section view of micro prism 37 in a plane substantially orthogonal to emission surface 33 of light guide 30, first tangent T1 that touches curved line 37c defining reflective curved surface 37b of effective inclined side surface 37a and second tangent T2 that touches curved line 37c in a different location than first tangent T1 form first angle θ1 that is greater than or equal to 0° and less than or equal to 30°.

Moreover, lighting apparatus 10 according to Embodiment 1 includes light guide 30 and light source 15 that introduces the light onto light incident surface 31 of light guide 30.

With this configuration, light emitted from light source 15 is incident on light incident surface 31 of light guide 30, guided in light guide 30, and then incident on reflective curved surface 37b of micro prism 37 in reflective surface 35. For example, when light rays are incident on effective inclined side surface 37a of micro prism 37 at equal angles of incidence relative to effective inclined side surface 37a, since first angle θ1 is greater than or equal to 0° and less than or equal to 30°, light rays guided in light guide 30 and incident on reflective curved surface 37b of effective inclined side surface 37a are reflected so as to spread at different angles. In other words, light rays guided by light guide 30 can easily be reflected at different angles so as to spread the light rays due to reflective curved surface 37b, even when the light rays are incident at equal angles of incidence relative to effective inclined side surface 37a of micro prism 37.

Next, how the rays of light are easily reflected so as to spread in different angles will be described with reference to FIG. 12, using an example in which lighting apparatus 10 including light guides 30 is installed on a ceiling.

Figure 12:
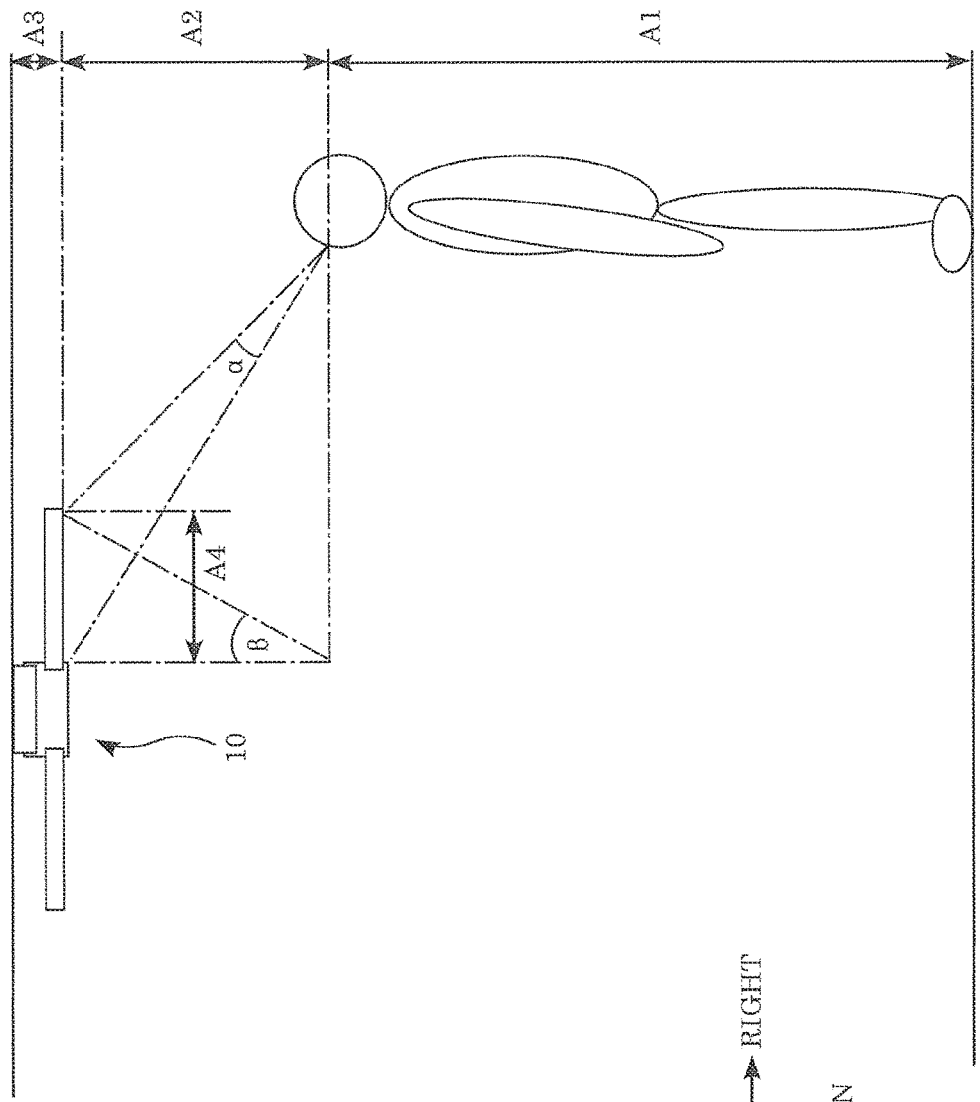
FIG. 12 is a schematic view illustrating the relationship between a user and the lighting apparatus according to Embodiment 1 when attached to a ceiling.

FIG. 12 is a schematic view illustrating the relationship between a user and the lighting apparatus according to Embodiment 1 when attached to a ceiling.

FIG. 12 illustrates a user looking up at lighting apparatus 10, which is turned on and attached to the ceiling of a 220 cm high room, from a location to the right of directly below lighting apparatus 10. In FIG. 12, the eye level height A1 of the user is 160 cm, height A2 from the eye level of the user to emission surface 33 of light guide 30 in lighting apparatus 10 is 52 cm, height A3 from emission surface 33 of light guide 30 in lighting apparatus 10 to the ceiling surface is 8 cm, and length A4 of emission surface 33 in lighting apparatus 10 closest to the user is 30 cm.

Angle α is an acute angle formed by a straight line from the right edge of emission surface 33 in the right hand side light guide 30 to an eye of the user intersecting a straight line from the left edge of emission surface 33 in the right hand side light guide 30 to an eye of the user. Angle ß is, in a state in which the user is looking up at emission surface 33 of light guide 30 in lighting apparatus 10 from directly below lighting apparatus 10, an acute angle formed by a straight line from the right edge of emission surface 33 in the right hand side light guide 30 to an eye of the user intersecting a straight line from the left edge of emission surface 33 in the right hand side light guide 30 (directly below which an eye of the user is located) to an eye of the user.

In this case with this lighting apparatus 10, if angle α and angle ß are 30° or less, compared to a light guide in which the micro prism does not include the reflective curved surface, light (luminance) is less likely to have an uneven appearance. More specifically, for example, when micro prism 37 does not include the reflective curved surface, light incident on effective inclined side surface 37a at an angle γ relative to effective inclined side surface 37a is reflected by effective inclined side surface 37a and emitted at angle γ. However, with light guide 30 in which reflective curved surface 37b is formed on effective inclined side surface 37a of micro prism 37, light guided by light guide 30 and incident on reflective curved surface 37b at angle γ is reflected by reflective curved surface 37b of effective inclined side surface 37a at an angle in a range from −30° to +30° of angle γ. In other words, with this light guide 30, light emitted from emission surface 33 is spread more widely than a light guide whose micro prism does not include the reflective curved surface.

Consequently, with light guide 30 according to Embodiment 1, since light rays are reflected at different angles even when the light rays are incident on effective inclined side surface 37a at the same angle of incidence relative to effective inclined side surface 37a, an uneven appearance of light (a state in which the light appears in streaks) in which the light appears bright from one position and dark from other positions is less likely to manifest. As a result, with this light guide 30, light (the distribution of light) emitted from emission surface 33 of light guide 30 can be controlled (the light distribution can be controlled) so as to achieve an even appearance. As a result, with this light guide 30, emitted light does not appear uneven to the user.

Moreover, even when reflective curved surface 37b occupies less than 50% of the surface area of effective inclined side surface 37a, the light still appears more even compared to when the micro prism does not include the reflective curved surface. However, since a large portion of the surface area of effective inclined side surface 37a is not covered by reflective curved surface 37b, the user tends to notice an unevenness in the light. As such, reflective curved surface 37b preferably covers at least 50% of the surface area of effective inclined side surface 37a.

Further, when first angle θ1 is greater than 30°, light guided to and reflected by reflective curved surface 37b is emitted and distributed from emission surface 33 in directions forming angles greater than an angle in a range from −30° to +30° of angle γ relative to light guided substantially parallel to emission surface 33 and reaching reflective curved surface 37b. In this case, light emitted from emission surface 33 of light guide 30 is excessively spread. In other words, it is difficult to obtain a desired light distribution. As such, first angle θ1 of reflective curved surface 37b is preferably greater than 0° and the less than or equal to 30°.

Accordingly, with light guide 30 and lighting apparatus 10 including light guide 30, unevenness in light emitted from emission surface 33 of light guide 30 can be inhibited.

Note that the strength (luminous intensity) of the light emitted from emission surface 33 of light guide 30 can be adjusted by controlling the strength of the light emitted by light source 15.

Moreover, with light guide 30 according to Embodiment 1, first tangent T1 touches curved line 37c defining reflective curved surface 37b of effective inclined side surface 37a at first inflection point H1. Second tangent T2 touches curved line 37c defining reflective curved surface 37b of effective inclined side surface 37a at second inflection point H2, which is an inflection point adjacent to first inflection point H1. First angle θ1 is an acute angle formed by first tangent T1 intersecting second tangent T2, and is greater than or equal to 5° and less than or equal to 30°.

Accordingly, with this light guide 30 as well, light emitted from emission surface 33 of light guide 30 can be controlled to be even more even. As a result, with this light guide 30, unevenness in light is less apparent to the user.

Moreover, with light guide 30 according to Embodiment 1, in a cross section view of micro prism 37 in a plane substantially orthogonal to emission surface 33 of light guide 30, first straight line L1 that passes through curved line 37c of effective inclined side surface 37a and is either coplanar with or parallel to reflective surface 35 of light guide 30 intersects third tangent T3 that touches an intersecting point of first straight line L1 and curved line 37c of effective inclined side surface 37a to form second angle θ2 that is an acute angle greater than 0° and less than or equal to 87°. Curved line 37c of effective inclined side surface 37a has a cycle that repeats a natural number of times.

With this configuration, when light rays are incident on effective inclined side surface 37a of micro prism 37 at equal angles of incidence relative to effective inclined side surface 37a, in one cycle of curved line 37c, the total sum of acute angles formed by a tangent touching curved line 37c at a given position and reflective surface 35 is equal to a total sum of acute angles formed by a tangent touching curved line 37c at a given position and first straight line L1 intersecting. Consequently, with this light guide 30 according to Embodiment 1, unevenness of light incident on fractional sections (excluding natural numbers) of curved line 37c is not likely to occur, such as in the case when curved line 37c does not have a cycle that repeats a natural number of times. As a result, with this light guide 30, light emitted from emission surface 33 of light guide 30 can be controlled to be even more even.

Further, even when second angle θ2 is an angle other than an angle in a range from 0° to 87°, inclusive, light guided to and reflected by reflective curved surface 37b is emitted and distributed from emission surface 33 in directions forming angles greater than an angle in the range from −30° to +30° of angle γ relative to light guided substantially parallel to emission surface 33 and reaching reflective curved surface 37b. In this case, light emitted from emission surface 33 of light guide 30 is excessively spread. In other words, it is difficult to obtain a desired light distribution. As such, second angle θ2 of reflective curved surface 37b is preferably greater than 0° and the less than or equal to 87°.

Further, when light guide 30 is fabricated by injection molding, regarding curved line 37c of micro prism 37, second angle θ2 is less than or equal to 87°. In other words, there is an incline (draft) relative to the direction in which the product is removed from its mold for the process for removing the injection-molded product from its mold. This allows for the molded product to be easily removed from its mold.

Moreover, with light guide 30 according to Embodiment 1, in a cross section view of micro prism 37 in a plane substantially orthogonal to emission surface 33 of light guide 30, curved line 37c of effective inclined side surface 37a includes a plurality of consecutive arcs, each being substantially equal in shape.

With this configuration, the arcs of curved line 37c in micro prism 37 have a shape that is universal and thus easy to design and form.

With this light guide 30 as well, when light rays are incident on effective inclined side surface 37a of micro prism 37 at equal angles of incidence relative to effective inclined side surface 37a, in one cycle of curved line 37c, the total sum of acute angles formed by a tangent touching curved line 37c at a given position and reflective surface 35 is equal to a total sum of acute angles formed by a tangent touching curved line 37c at a given position and first straight line L1 intersecting. Consequently, with this light guide 30 according to Embodiment 1, for example, unevenness of light incident on fractional sections (excluding natural numbers) of curved line 37c is not likely to occur, such as in the case when curved line 37c does not have a cycle that repeats a natural number of times. As a result, with this light guide 30, light emitted from emission surface 33 of light guide 30 can be controlled to be even more even.

Moreover, with light guide 30 according to Embodiment 1, curved line 37c defining reflective curved surface 37b of inclined side surface 37a includes a plurality of consecutive arcs, first inflection point H is at a first end of one arc of the plurality of consecutive arcs, and second inflection point H2 is at a second end of the one arc of the plurality of consecutive arcs.

Moreover, with light guide 30 according to Embodiment 1, each of the plurality of consecutive arcs has a same shape with a first end of one arc being connected with a second end of an adjacent arc so as to have point symmetry about the first end.

Moreover, with light guide 30 according to Embodiment 1, the plurality of consecutive arcs have equal radii and equal lengths.

Moreover, with light guide 30 according to Embodiment 1, for the plurality of consecutive arcs, a total number of valley arcs is equal to a total number of peak arcs.

Moreover, with light guide 30 according to Embodiment 1, curved line 37c defining reflective curved surface 37b of inclined side surface 37a includes a cycle that repeats a natural number of times, one cycle of the curved line includes a first arc forming a peak and a second arc forming a valley, first inflection point H1 is at a first end of one arc of the cycle, and second inflection point H2 is at a second end of the one arc of the cycle.

Moreover, with light guide 30 according to Embodiment 1, the one arc of the cycle, including the first end at which first inflection point H1 is present and the second end at which second inflection point H2 is present, is the arc forming the peak.

Moreover, with light guide 30 according to Embodiment 1, second tangent T2 is third tangent T3.

Moreover, with light guide 30 according to Embodiment 1, the depression includes a second inclined side surface that does not face the light incident surface, and the second inclined side surface does not include a curved surface.

Variation 1 of Embodiment 1

(Configuration)

Next, the configuration of light guide 30 according to Variation 1 of Embodiment 1 will be described with reference to FIG. 13.

Figure 13:
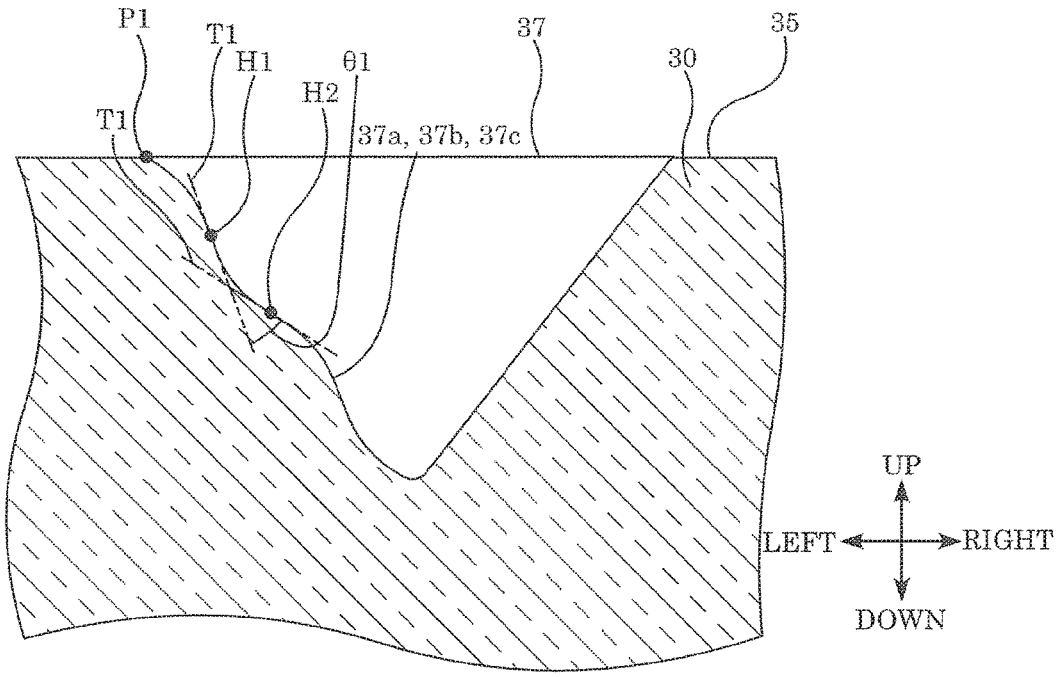
FIG. 13 is an enlarged cross section view of a micro prism in the light guide according to Variation 1 of Embodiment 1.

FIG. 13 is an enlarged cross section view of a micro prism in the light guide according to Variation 1 of Embodiment 1.

As illustrated in FIG. 13, other configurations of this light guide 30 are the same as light guide 30 according to Embodiment 1. Like elements share like reference numbers, and detailed description of those configurations are omitted.

In Embodiment 1, in a cross section view of micro prism 37 in a plane substantially orthogonal to emission surface 33 of light guide 30, curved line 37c of effective inclined side surface 37a in micro prism 37 of light guide 30 is defined by an arc, but in Variation 1 of Embodiment 1, curved line 37c of effective inclined side surface 37a defined by a section of an approximate sinusoid.

Note that it is sufficient if reflective curved surface 37b is a section of an approximate sinusoid; the section may start at any given location on the approximate sinusoid at a connection point of reflective surface 35 of light guide 30 and curved line 37c (hereinafter referred to as first connection point P1). Moreover, curved line 37c maybe an approximate cosine curve of the approximate sinusoid with inverted peaks and valleys.

Curved line 37c configured of a section of an approximate sinusoid preferably has a cycle that repeats a natural number of times. More specifically, the approximate sinusoids defining curved line 37c are aligned so as to form a wave-like line configured of peaks and valleys. When one cycle of curved line 37c is configured of an approximate sinusoid forming a peak and an approximate sinusoid forming a valley, curved line 37c has at least one cycle that repeats a natural number of times. In other words, in reflective curved surface 37b, the total number of valleys in the approximate sinusoid is equal to the total number of peaks in the approximate sinusoid.

Advantageous Effects

Next, the advantageous effects of light guide 30 according to Variation 1 of Embodiment 1 will be described.

As described above, with light guide 30 according to Variation 1 of Embodiment 1, in a cross section view of micro prism 37 in a plane substantially orthogonal to emission surface 33 of light guide 30, curved line 37c of effective inclined side surface 37a is a section of an approximate sinusoid.

With this configuration, the approximate sinusoid shape of curved line 37c in micro prism 37 is universal and thus easy to design and form. Moreover, curved line 37c configured of an approximate sinusoid transitions smoothly at the inflection point, making it possible to inhibit unevenness in light emitted from emission surface 33 of light guide 30.

Moreover, with this light guide 30 as well, when light rays are incident on effective inclined side surface 37a of micro prism 37 at equal angles of incidence relative to effective inclined side surface 37a, in one cycle of curved line 37c, the total sum of acute angles formed by a tangent touching curved line 37c at a given position and reflective surface 35 is equal to a total sum of acute angles formed by a tangent touching curved line 37c at a given position and first straight line L1 intersecting. Consequently, with this light guide 30 according to Embodiment 1, for example, unevenness of light incident on fractional sections (excluding natural numbers) of curved line 37c is not likely to occur, such as in the case when curved line 37c does not have a cycle that repeats a natural number of times. As a result, with this light guide 30, light emitted from emission surface 33 of light guide 30 can be controlled to be even more even.

Other advantageous effects with respect to Embodiment 1 also apply to Variation 1 of Embodiment 1.

Variation 2 of Embodiment 1

(Configuration)

Next, the configuration of light guide 30 according to Variation 2 of Embodiment 1 will be described with reference to FIG. 14.

Figure 14:
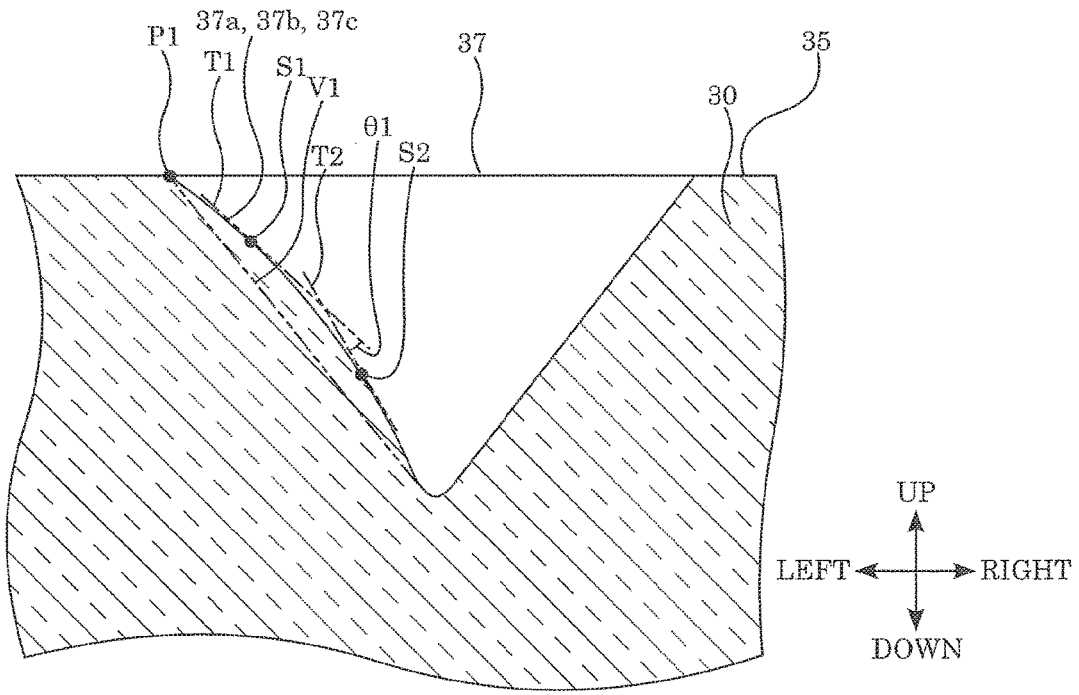
FIG. 14 is an enlarged cross section view of a micro prism in the light guide according to Variation 2 of Embodiment 1.

FIG. 14 is an enlarged cross section view of a micro prism in the light guide according to Variation 2 of Embodiment 1.

In FIG. 14, virtual line V1, illustrated with a double-dot, single-dashed line, indicates where the side surface would be if curved line 37c were not formed on micro prism 37.

As illustrated in FIG. 14, other configurations of this light guide 30 are the same as light guide 30 according to Embodiment 1. Like elements share like reference numbers, and detailed description of those configurations are omitted.

In Embodiment 1, in a cross section view of micro prism 37 in a plane substantially orthogonal to emission surface 33 of light guide 30, curved line 37c of effective inclined side surface 37a in micro prism 37 of light guide 30 is defined by an arc. Variation 2 of Embodiment 1 differs from Embodiment 1 in that curved line 37c of effective inclined side surface 37a does not include an inflection point. Further, a line that touches curved line 37c at a given point S1 is defined as first tangent T1 and a line that touches curved line 37c at a different given point is defined as second tangent T2.

In other words, curved line 37c of effective inclined side surface 37a in Variation 2 of Embodiment 1 is a curved line that does not include an inflection point, and does not form a wave-like line similar to curved line 37c of effective inclined side surface 37a according to Embodiment 1. Note that a curved line that does not include an inflection point is, for example, an arc or parabola. In Variation 2 of Embodiment 1, an arc is used as one example of a curved line that does not include an inflection point. This curved line that does not include an inflection point defines a curved surface.

Curved line 37c of micro prism 37 is an arc that protrudes from virtual line V1.

Figure 15A:
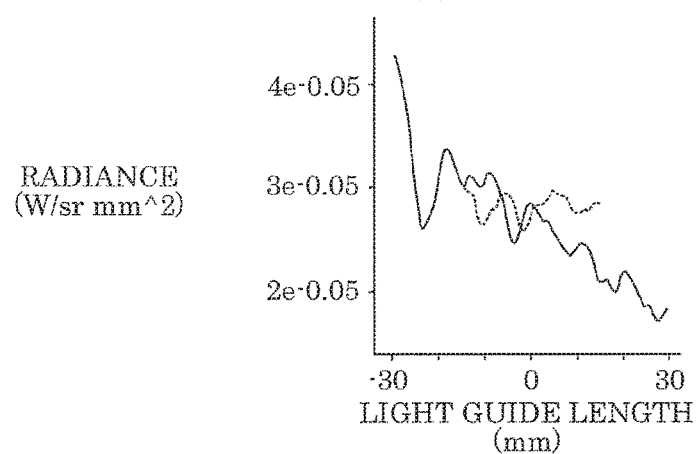
FIG. 15A illustrates a graph indicating the relationship between radiance in the left and right directions of the light guide according to Variation 2 of Embodiment 1 and length in the left and right directions and forward and backward directions of the light guide.
Figure 15B:
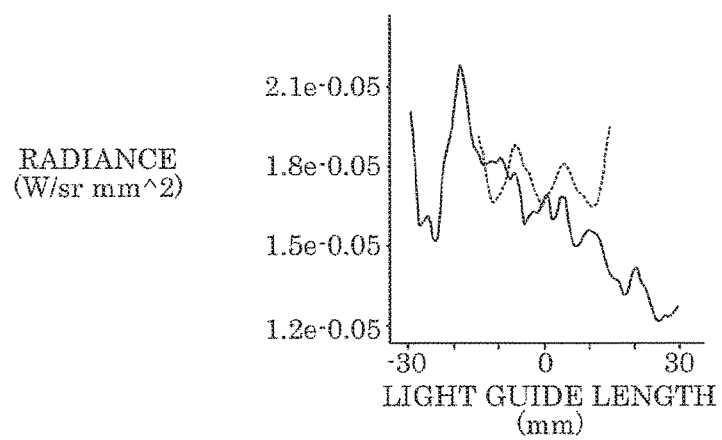
FIG. 15B illustrates a graph indicating the relationship between radiance in the left and right directions of the light guide according to Variation 2 of Embodiment 1 and length in the left and right directions and forward and backward directions of the light guide.
Figure 15C:
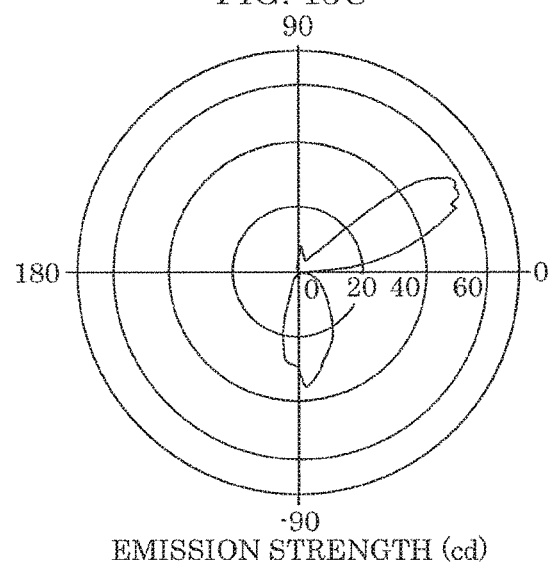
FIG. 15C illustrates a light distribution profile of the light guide according to Variation 2 of Embodiment 1.

In this light guide 30, simulated light distribution profiles and radiances of light guide 30 are illustrated in FIG. 15A, FIG. 15B, and FIG. 15C.

The model light guide 30 used in lighting apparatus 10 and on which the simulations were performed is the same model used in Embodiment 1.

FIG. 15A and FIG. 15B are graphs illustrating the relationship between radiance in the left and right directions of the light guide according to Variation 2 of Embodiment 1 and length in the left and right directions and forward and backward directions of the light guide.

In FIG. 15A, the solid line represents light emitted from emission surface 33 of light guide 30 on a straight line extending in the left and right directions and orthogonal to the forward and backward directions in the central region of light guide 30 in a plan view of emission surface 33 of light guide 30. Further, in FIG. 15A, the dashed line represents light emitted from emission surface 33 of light guide 30 on a straight line extending in the forward and backward directions and orthogonal to the left and right direction in the central region of light guide 30 in a plan view of emission surface 33 of light guide 30.

As illustrated in FIG. 15A, reflective curved surface 37b is formed in micro prism 37 of this light guide 30 such that first angle θ1=10°.

The solid and dashed line graphs show that radiance is less than when reflective curved surface 37b is not formed on effective inclined side surface 37a (i.e., when first angle θ1=0°), such as in the example illustrated in FIG. 7A. Further, the amplitudes of the graphs of radiances illustrated by the solid and dashed lines are also lower than when reflective curved surface 37b is not formed on effective inclined side surface 37a (i.e., when first angle θ1=0°), such as in the example illustrated in FIG. 7A.

In FIG. 15B, the solid line represents light emitted from emission surface 33 of light guide 30 on a straight line extending in the left and right directions and orthogonal to the forward and backward directions in the central region of light guide 30 in a view tilted 45° relative to a plan view of emission surface 33 of light guide 30. Further, in FIG. 15B, the dashed line represents light emitted from emission surface 33 of light guide 30 on a straight line extending in the forward and backward directions and orthogonal to the left and right direction in the central region of light guide 30 in a plan view of emission surface 33 of light guide 30.

The solid and dashed line graphs show that radiance is less than when reflective curved surface 37b is not formed on effective inclined side surface 37a (i.e., when first angle θ1=0°), such as in the example illustrated in FIG. 7B. Further, the amplitudes of the graphs of radiances illustrated by the solid and dashed lines are also lower than when reflective curved surface 37b is not formed on effective inclined side surface 37a (i.e., when first angle θ1=0°), such as in the example illustrated in FIG. 7B.

FIG. 15C illustrates a light distribution profile of the light guide according to Variation 2 of Embodiment 1.

As illustrated in FIG. 15C, the vicinity around the −90° mark illustrates the emission strength of light reflected by micro prisms 37. The maximum luminous intensity of this light guide 30 is 41.2 cd. Further, the vicinity around the 30° mark in the light distribution profile illustrates the emission strength of light emitted out without being reflected by micro prisms 37.

The maximum luminous intensity of light reflected by micro prism 37 in light guide 30 is less than the example illustrated in FIG. 7B in which reflective curved surface 37b is not formed on effective inclined side surface 37a (i.e., when first angle θ1=0°). In other words, with this light guide 30, the strength of light traveling in a predetermined direction is weaker than in the example illustrated in FIG. 7B in which reflective curved surface 37b is not formed on effective inclined side surface 37a (i.e., when first angle θ1=0°). As such, in this light guide 30, light is emitted from emission surface 33 more broadly than the example illustrated in FIG. 7B in which reflective curved surface 37b is not formed on effective inclined side surface 37a (i.e., when first angle θ1=0°).

Advantageous Effects

Next, the advantageous effects of light guide 30 according to Variation 2 of Embodiment 1 will be described.

As described above, with light guide 30 according to Variation 2 of Embodiment 1, in a cross section view of micro prism 37 in a plane substantially orthogonal to emission surface 33 of light guide 30, curved line 37c of effective inclined side surface 37a does not include an inflection point.

Further, with light guide 30 according to Variation 2 of Embodiment 1, in a cross section view of micro prism 37 in a plane substantially orthogonal to emission surface 33 of light guide 30, curved line 37c of effective inclined side surface 37a bows inward in light guide 30.

With this configuration, so long as curved line 37c in micro prism 37 is an arc, curved line 37c is universal and thus easy to design and form.

Other advantageous effects with respect to Embodiment 1 also apply to Variation 2 of Embodiment 1.

Variation 3 of Embodiment 1

Next, the configuration of light guide 30 according to Variation 3 of Embodiment 1 will be described with reference to FIG. 16.

Figure 16:
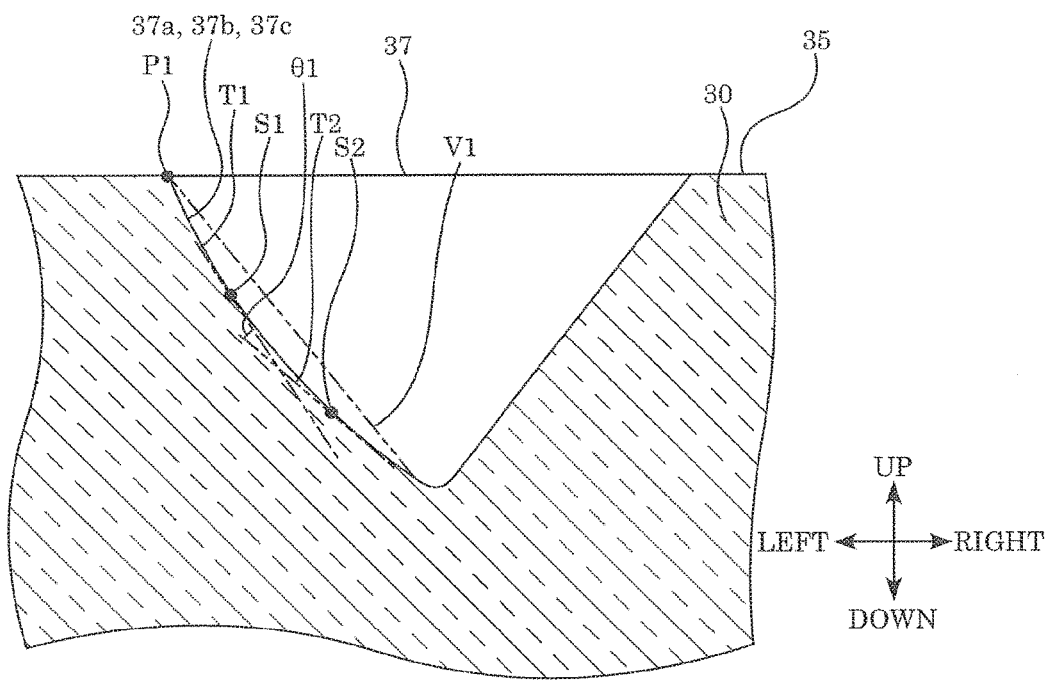
FIG. 16 is an enlarged cross section view of a micro prism in the light guide according to Variation 3 of Embodiment 1.

FIG. 16 is an enlarged cross section view of a micro prism in the light guide according to Variation 3 of Embodiment 1.

As illustrated in FIG. 16, other configurations of this light guide 30 are the same as light guide 30 according to Embodiment 1. Like elements share like reference numbers, and detailed description of those configurations are omitted.

In Variation 2 of Embodiment 1, curved line 37c of micro prism 37 is an arc that protrudes from virtual line V1 so as to form a peak. In contrast, in Variation 3 of Embodiment 1, curved line 37c of micro prism 37 is an arc that recedes from virtual line V1 so as to form a valley.

Other advantageous effects with respect to Embodiment 1 also apply to Variation 3 of Embodiment 1.

Embodiment 2

(Configuration)

Next, the configuration of light guide 30 according to Embodiment 2 will be described with reference to FIG. 17.

Figure 17:
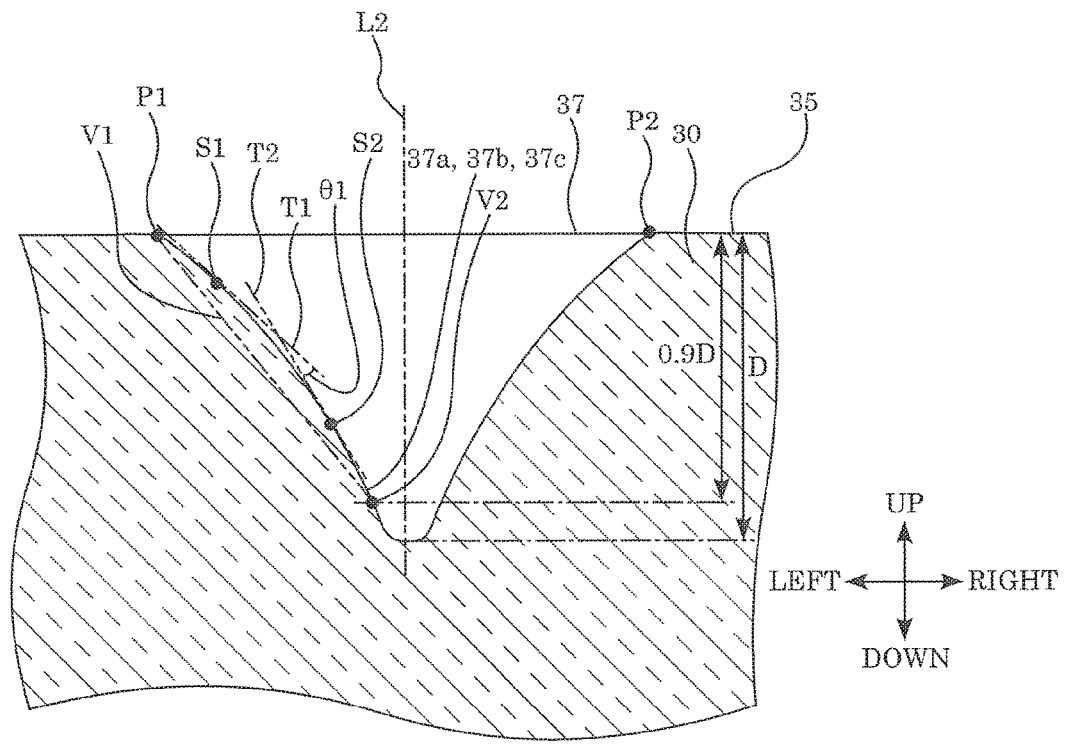
FIG. 17 is an enlarged cross section view of a micro prism in the light guide according to Embodiment 2.

FIG. 17 is an enlarged cross section view of a micro prism in the light guide according to Embodiment 2.

As illustrated in FIG. 17, other configurations of this light guide 30 are the same as light guide 30 according to Embodiment 1. Like elements share like reference numbers, and detailed description of those configurations are omitted.

As illustrated in FIG. 17, in a cross section view of micro prism 37 in a plane substantially orthogonal to emission surface 33 of light guide 30, in micro prism 37, a first point at which effective inclined side surface 37a touches reflective surface 35 of light guide 30 is defined as first connection point P1, and the second point at which effective inclined side surface 37a touches reflective surface 35 is defined as second connection point P2. A line passing through an approximate midpoint of a straight line extending from first connection point P1 to second connection point P2 is defined as second straight line L2. Micro prism 37 is substantially symmetrical about second straight line L2. Note that first connection points P1 define a line that connects reflective surface 35 and effective inclined side surface 37a. Note that the positional relationship between first connection point P1 and second connection point P2 may be reversed.

Note that effective inclined side surface 37a is not limited to the side surface of micro prism 37 that faces light incident surface 31 of light guide 30; effective inclined side surface 37a may be formed on the side surface opposite the above-described side surface that faces light incident surface 31 of light guide 30, and may be formed on the entire inner circumferential surface of micro prism 37.

Second straight line L2 extends substantially perpendicular to reflective surface 35. In other words, second straight line L2 is preferably substantially perpendicular to reflective surface 35.

The inner circumferential surface of micro prism 37 is defined by an arc. In other words, curved line 37c that defines effective inclined side surface 37a of light guide 30 is also an arc. Curved line 37c that defines effective inclined side surface 37a of light guide 30 occupies up to 90% of depth D of micro prism 37. Depth D of micro prism 37 is the distance, measured vertically downward, from a line aligned with reflective surface 35 of light guide 30 to the deepest part of micro prism 37. Note that 90% of depth D is also written as 0.9 D.

Note that although not illustrated in the drawings, in a cross section view of micro prism 37 in a plane substantially orthogonal to emission surface 33 (one example of the front surface) of light guide 30, the inner circumferential surface of micro prism 37 may have a shape of a section of an approximate sinusoid, like in Variation 1 of Embodiment 1, and may have a curved surface that does not include an inflection point, like in Variation 2 of Embodiment 1.

In micro prism 37, a point at which effective inclined side surface 37a touches reflective surface 35 of light guide 30 is defined as first connection point P1, and a point at which effective inclined side surface 37a intersects a straight line that passes through the 90% point of depth D of micro prism 37 and is parallel to reflective surface 35 of light guide 30 is defined as virtual point V2.

In other words, curved line 37c of effective inclined side surface 37a in micro prism 37 is formed from first connection point P1 to virtual point V2. Stated differently, curved line 37c of effective inclined side surface 37a is not formed from virtual point V2 to the deepest part (i.e., the bottom) of micro prism 37.

Note that in a cross section view of micro prism 37 in a plane substantially orthogonal to emission surface 33 of light guide 30, the bottom of micro prism 37 may have a concave or convex curved surface that bows toward emission surface 33, may taper to a point, or may be flat.

Advantageous Effects

Next, the advantageous effects of light guide 30 according to Embodiment 2 will be described.

As described above, with light guide 30 according to Embodiment 2, in a cross section view of micro prism 37 in a plane substantially orthogonal to emission surface 33 of light guide 30, micro prism 37 is substantially symmetrical about second straight line L2 passing through an approximate midpoint of a straight line extending from one point (in this embodiment, first connection point P1) at which effective inclined side surface 37a touches reflective surface 35 to another point (in this embodiment, second connection point P2) at which effective inclined side surface 37a touches reflective surface 35.

With this configuration, micro prism 37 can be easily formed in reflective surface 35.

Moreover, with light guide 30 according to Embodiment 2, second straight line L2 extends substantially perpendicular to reflective surface 35.

With this configuration, micro prism 37 can be even more easily formed in reflective surface 35.

As described above, with light guide 30 according to Embodiment 2, in a cross section view of micro prism 37 in a plane substantially orthogonal to emission surface 33 of light guide 30, curved line 37c of effective inclined side surface 37a occupies up to 90% of depth D of micro prism 37.

Next, the surface area of the inner circumferential surface of micro prism 37 will be calculated for when micro prism 37 is approximately conical in shape. The length from first connection point P1 of effective inclined side surface 37a to the deepest part (i.e., the bottom) of micro prism 37 is defined as R, and the radius of micro prism 37 is defined as r. Here, the surface area of the inner circumferential surface of micro prism 37 can be expressed as πRr.

Further, the surface area of the inner circumferential surface of the portion of micro prism 37 from virtual point V2 of effective inclined side surface 37a to the deepest part (i.e., the bottom) of micro prism 37 can be expressed as 0.01 πRr.

In other words, effective inclined side surface 37a occupies 99% of the range from 0% to 90%, inclusive, of depth D of micro prism 37.

As such, with this configuration, even if curved line 37c of effective inclined side surface 37a is not formed deeper than 90% of depth D of micro prism 37, light guided by light guide 30 and incident on reflective curved surface 37b of effective inclined side surface 37a is reflected so as to spread at different angles. As such, it is not necessary to form curved line 37c of effective inclined side surface 37a in locations deeper than 90% of depth D of micro prism 37, thus making it easy to produce micro prism 37. This consequently inhibits a sudden increase in costs pertaining to micro prism 37 production.

Moreover, with light guide 30 according to Embodiment 2, the depression has a conical shape.

Other advantageous effects with respect to Embodiment 1 also apply to Embodiment 2.

Variation 1 of Embodiment 2

Next, the configuration of light guide 30 according to Variation 1 of Embodiment 2 will be described with reference to FIG. 18.

Figure 18:
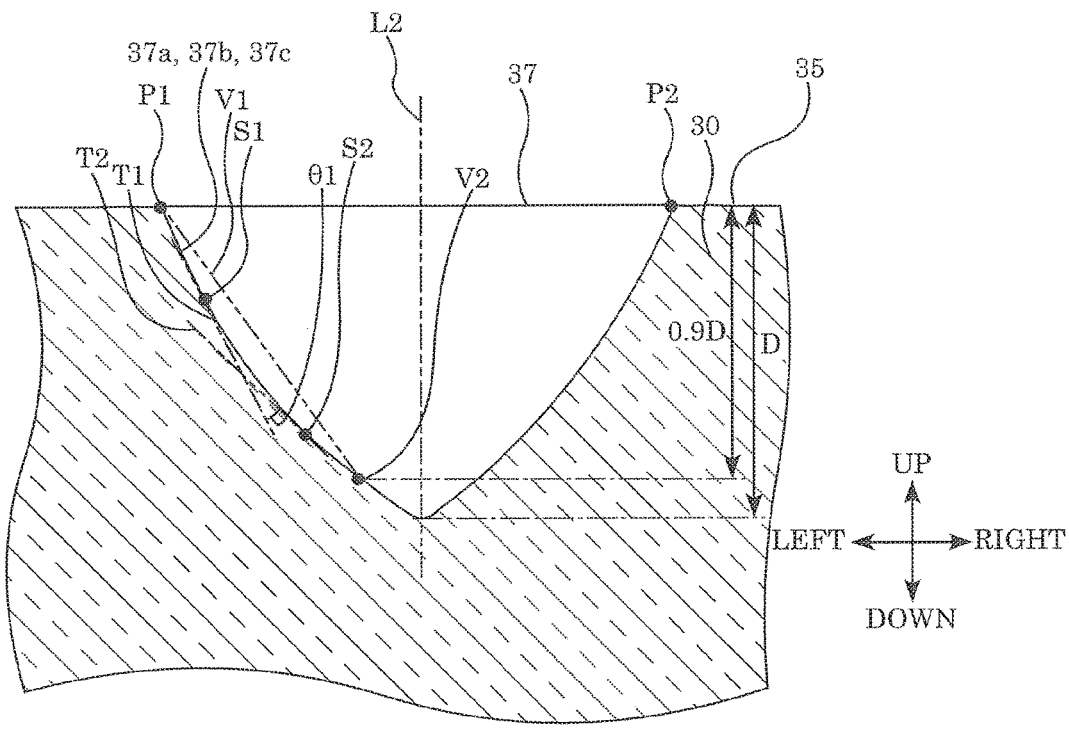
FIG. 18 is an enlarged cross section view of a micro prism in the light guide according to Variation 1 of Embodiment 2.

FIG. 18 is an enlarged cross section view of a micro prism in the light guide according to Variation 1 of Embodiment 2.

As illustrated in FIG. 18, other configurations of this light guide 30 are the same as light guide 30 according to Embodiment 1. Like elements share like reference numbers, and detailed description of those configurations are omitted.

In Embodiment 2, the inner circumferential surface of micro prism 37 is defined by an arc that protrudes from virtual line V1 so as to form a peak. In contrast, in Variation 1 of Embodiment 2, curved line 37c of micro prism 37 is defined by an arc that recedes from virtual line V1 so as to form a valley.

Other advantageous effects with respect to Embodiments 1 and 2 also apply to Variation 1 of Embodiment 2.

Variation 2 of Embodiment 2

Next, the configuration of light guide 30 according to Variation 2 of Embodiment 2 will be described with reference to FIG. 19.

Figure 19:
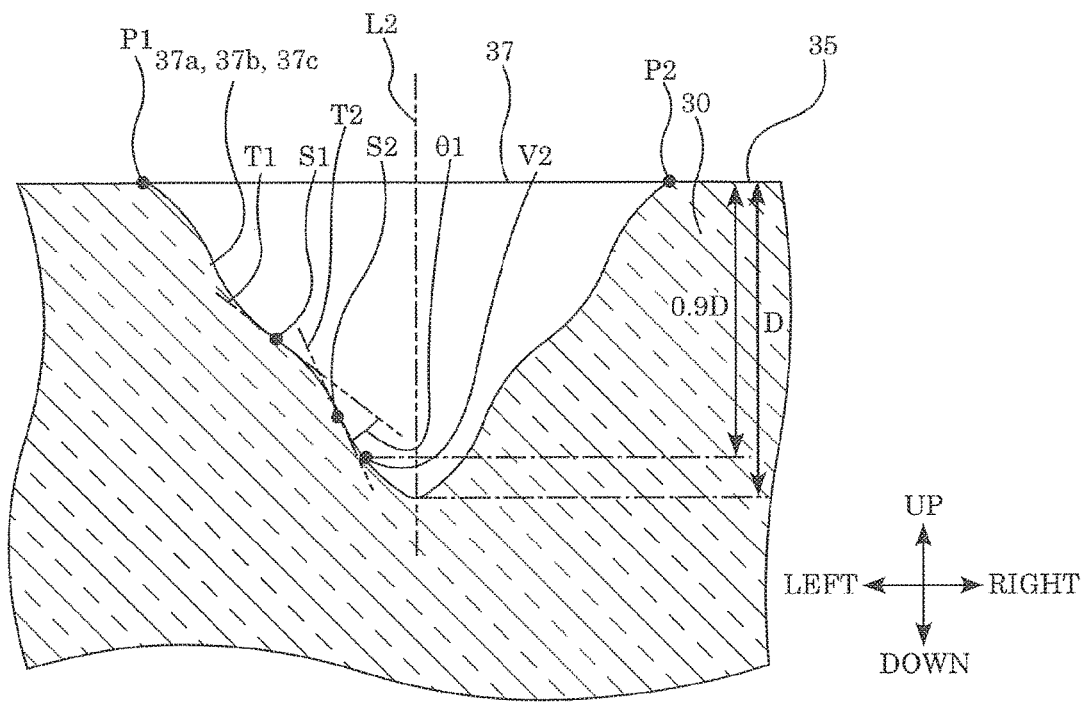
FIG. 19 is an enlarged cross section view of a micro prism in the light guide according to Variation 2 of Embodiment 2.

FIG. 19 is an enlarged cross section view of a micro prism in the light guide according to Variation 2 of Embodiment 2.

As illustrated in FIG. 19, other configurations of this light guide 30 are the same as light guide 30 according to Embodiment 1. Like elements share like reference numbers, and detailed description of those configurations are omitted.

In Embodiment 2, the inner circumferential surface of micro prism 37 is defined by an arc that protrudes from virtual line V1 so as to form a peak. In contrast, in Variation 2 of Embodiment 2, curved line 37c of micro prism 37 is defined by a plurality of consecutive arcs aligned so as to form a wave-like line.

Other advantageous effects with respect to Embodiments 1 and 2 also apply to Variation 2 of Embodiment 2.

(Other Variations)

Hereinbefore, light guide 30 and lighting apparatus 10 including light guide 30 according to the present disclosure have been described based on Embodiments 1 and 2, Variations 1 through 3 of Embodiment 1, and Variations 1 and 2 of Embodiment 2, but the present disclosure is not limited to Embodiments 1 and 2, Variations 1 through 3 of Embodiment 1, and Variations 1 and 2 of Embodiment 2.

For example, in Embodiments 1 and 2, Variations 1 through 3 of Embodiment 1, and Variations 1 and 2 of Embodiment 2, the reflective surface may be treated to increase the light reflection rate of the surface, by, for example, applying thereon a highly reflective coating or an aluminum deposition film. With this, the reflective rate of light on the reflective surface is greater than when the surface is not treated to increase the light reflection rate, making it possible to effectively reflect light from the light source.

Moreover, when a plurality of light guides are used, each of the light guides may emit light of a different color temperature. In this case, for example, one light guide may emit "daylight" colored light, and another light guide may emit "incandescent bulb" colored light.

The top surface of the main body may be designed to surround the external power source when the main body is coupled to the external power source, and may include a resilient part that fills in the gap between the main body and the ceiling. Rubber or a sponge-like material is preferably used for the resilient part. With such a lighting apparatus, the resilient part may be squeezed between the main body and the ceiling upon coupling the main body to the external power source such that the resilient part exerts a repelling force that securely fixes the lighting apparatus to the ceiling in a steady fashion.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A light guide, comprising:
   a front surface;
   a back surface opposite the front surface and including a depression; and
   a light incident surface that introduces light, the light reflecting off the depression and being emitted through the front surface,
   wherein the depression includes an inclined side surface that faces the light incident surface,
   the inclined side surface includes a reflective curved surface that includes at least 50% of a surface area of the inclined side surface, and in a cross section view of the depression in a plane substantially orthogonal to the front surface of the light guide, a first tangent that touches a curved line defining the reflective curved surface of the inclined side surface and a second tangent that touches the curved line in a different location than the first tangent form a first angle that is greater than or equal to 0° and less than or equal to 30°.

2. The light guide according to claim 1, wherein
the first tangent touches the curved line defining the reflective curved surface of the inclined side surface at a first inflection point,
the second tangent touches the curved line defining the reflective curved surface of the inclined side surface at a second inflection point adjacent the first inflection point, and
the first angle is an acute angle formed by the first tangent intersecting the second tangent, and is greater than or equal to 5° and less than or equal to 30°.

3. The light guide according to claim 2, wherein
the curved line defining the reflective curved surface of the inclined side surface includes a plurality of consecutive arcs,
the first inflection point is at a first end of one arc of the plurality of consecutive arcs, and
the second inflection point is at a second end of the one arc of the plurality of consecutive arcs.

4. The light guide according to claim 3, wherein
each of the plurality of consecutive arcs has a same shape with a first end of one arc being connected with a second end of an adjacent arc so as to have point symmetry about the first end.

5. The light guide according to claim 4, wherein
the plurality of consecutive arcs have equal radii and equal lengths.

6. The light guide according to claim 3, wherein
for the plurality of consecutive arcs, a total number of valley arcs is equal to a total number of peak arcs.

7. The light guide according to claim 2, wherein
the curved line defining the reflective curved surface of the inclined side surface includes a cycle that repeats a natural number of times,
one cycle of the curved line includes a first arc forming a peak and a second arc forming a valley,
the first inflection point is at a first end of one arc of the cycle, and the second inflection point is at a second end of the one arc of the cycle.

8. The light guide according to claim 7, wherein
the one arc of the cycle, including the first end at which the first inflection point is present and the second end at which the second inflection point is present, is the arc forming the peak.

9. The light guide according to claim 1, wherein
in the cross section view of the depression in the plane substantially orthogonal to the front surface of the light guide:
  a first straight line that passes through the curved line of the inclined side surface and is either one of coplanar with and parallel to the back surface intersects a third tangent that touches an intersecting point of the first straight line and the curved line of the inclined side surface to form a second angle that is an acute angle greater than 0° and less than or equal to 87°; and
the curved line of the inclined side surface has a cycle that repeats a natural number of times.

10. The light guide according to claim 9, wherein
the second tangent is the third tangent.

11. The light guide according to claim 1, wherein
in the cross section view of the depression in the plane substantially orthogonal to the front surface of the light guide, the curved line of the inclined side surface includes a plurality of consecutive arcs, each being substantially equal in shape.

12. The light guide according to claim 1, wherein
in the cross section view of the depression in the plane substantially orthogonal to the front surface of the light guide, the curved line of the inclined side surface is a section of an approximate sinusoid.

13. The light guide according to claim 1, wherein
in the cross section view of the depression in the plane substantially orthogonal to the front surface of the light guide, the curved line of the inclined side surface does not include an inflection point.

14. The light guide according to claim 13, wherein
in the cross section view of the depression in the plane substantially orthogonal to the front surface of the light guide, the curved line of the inclined side surface bows inward in the light guide.

15. The light guide according to claim 1, wherein
in the cross section view of the depression in the plane substantially orthogonal to the front surface of the light guide, the curved line of the inclined side surface occupies up to 90% of a depth of the depression.

16. The light guide according to claim 1, wherein
in the cross section view of the depression in the plane substantially orthogonal to the front surface of the light guide, the depression is substantially symmetrical about a second straight line passing through an approximate midpoint of a straight line extending from a first point at which the inclined side surface touches the back surface to a second point at which the inclined side surface touches the back surface.

17. The light guide according to claim 16, wherein
the second straight line extends substantially perpendicular to the back surface.

18. The light guide according to claim 1, wherein
the depression has a conical shape.

19. The light guide according to claim 1, wherein
the depression includes a second inclined side surface that does not face the light incident surface, and
the second inclined side surface does not include a curved surface.

20. A lighting apparatus, comprising:
the light guide according to claim 1; and
a light source that introduces the light onto the light incident surface of the light guide.

* * * * *